United States Patent
Kanemitsu et al.

(10) Patent No.: US 9,083,898 B2
(45) Date of Patent: Jul. 14, 2015

(54) SOLID-STATE IMAGING DEVICE AND CAMERA MODULE

(71) Applicant: Kabushiki Kaisha Toshiba, Minato-ku (JP)

(72) Inventors: Shiroshi Kanemitsu, Yokohama (JP); Atsuhiko Nunokawa, Yokohama (JP); Miho Iizuka, Yokohama (JP); Makoto Monoi, Oita (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 96 days.

(21) Appl. No.: 14/082,625

(22) Filed: Nov. 18, 2013

(65) Prior Publication Data

US 2014/0240536 A1 Aug. 28, 2014

(30) Foreign Application Priority Data

Feb. 28, 2013 (JP) ................................. 2013-038539

(51) Int. Cl.
*H04N 5/355* (2011.01)
*H04N 5/357* (2011.01)

(52) U.S. Cl.
CPC ......... *H04N 5/35563* (2013.01); *H04N 5/3572* (2013.01)

(58) Field of Classification Search
None
See application file for complete search history.

(56) References Cited

U.S. PATENT DOCUMENTS

| | | | |
|---|---|---|---|
| 8,018,516 B2* | 9/2011 | Hirai et al. ..................... | 348/308 |
| 8,040,411 B2 | 10/2011 | Nakajima et al. | |
| 8,456,546 B2 | 6/2013 | Oike | |
| 2008/0291296 A1 | 11/2008 | Oike | |
| 2009/0295941 A1 | 12/2009 | Nakajima et al. | |
| 2011/0032403 A1 | 2/2011 | Mabuchi | |
| 2012/0113290 A1 | 5/2012 | Nakata et al. | |
| 2012/0268627 A1 | 10/2012 | Oike | |
| 2013/0038751 A1* | 2/2013 | Kurahashi et al. ......... | 348/222.1 |
| 2013/0050529 A1* | 2/2013 | Murayama .................... | 348/234 |

FOREIGN PATENT DOCUMENTS

| | | |
|---|---|---|
| JP | 3-117281 | 5/1991 |
| JP | 2004-336468 | 11/2004 |
| JP | 3979682 | 7/2007 |

(Continued)

OTHER PUBLICATIONS

Korean Office Action issued Oct. 22, 2014, in Korea Patent Application No. 10-2013-147328 (with English translation).

*Primary Examiner* — Roberto Velez
*Assistant Examiner* — Yih-Sien Kao
(74) *Attorney, Agent, or Firm* — Oblon, McClelland, Maier & Neustadt, L.L.P.

(57) ABSTRACT

According to one embodiment, a solid-state imaging device includes a pixel array and a high dynamic range (HDR) synthesizing circuit 19. A pixel is configured as a small pixel group. The HDR synthesizing circuit 19 includes a valid pixel selecting unit 34, a sensitivity ratio correcting unit 35, and a calculation processing unit 36. The valid pixel selecting unit 34 selects one or more small pixels validating a use of a signal value in the HDR synthesis as a valid pixel from among the small pixel group. The sensitivity ratio correcting unit 35 executes sensitivity ratio correction on the signal value of each small pixel. The calculation processing unit 36 uses the signal value of the valid pixel among the signal values of the small pixels from the sensitivity ratio correcting unit 35 for a calculation for the HDR synthesis.

20 Claims, 17 Drawing Sheets

(56) References Cited

FOREIGN PATENT DOCUMENTS

| JP | 2009-200762 | 9/2009 | |
| JP | 2009-303043 | 12/2009 | |
| JP | 2010-118876 | 5/2010 | |
| JP | 2011-40926 | 2/2011 | |
| JP | 2011-71709 | 4/2011 | |
| JP | 2012-104979 | 5/2012 | |
| JP | 2013042428 A | * | 2/2013 |
| KR | 10-2008-0103454 | 11/2008 | |
| KR | 10-2009-0126185 | 12/2009 | |

* cited by examiner

US 9,083,898 B2

SOLID-STATE IMAGING DEVICE AND CAMERA MODULE

CROSS-REFERENCE TO RELATED APPLICATIONS

This application is based upon and claims the benefit of priority from Japanese Patent Application No. 2013-038539, filed on Feb. 28, 2013; the entire contents of all of which are incorporated herein by reference.

FIELD

Embodiments described herein relate generally to a solid-state imaging device and a camera module.

BACKGROUND

In recent years, in solid-state imaging devices, a dynamic range of a pixel has been reduced as the number of pixels increases and the size of a pixel decreases. In the solid-state imaging devices, a portion of a subject having high brightness is likely to undergo saturation of output charges on a quantity of incident light. For example, measures of reducing an output gain or reducing a charge accumulation time may be taken on the saturation of the output charges. In this case, the saturation of the output charges can be reduced in a portion with high brightness, but it is difficult to obtain an appropriate output in a portion with low brightness.

A high dynamic range (HDR) synthesis is known as a photography technique for expressing a dynamic range larger than in normal photography. For example, as a HDR synthesis technique, there is a technique of causing a charge accumulation time or an output gain to differ according to a horizontal line formed by arranging pixels in a row in the horizontal direction. According to this technique, the resolution in the vertical direction practically decreases by half compared to the case of normal photography, and thus there is a problem in that the resolution is lowered.

Further, as another HDR synthesis technique, for example, there is a technique of synthesizing two or more images obtained by making charge accumulation times or output gains different from each other. According to this technique, a frame rate of a synthetic image is delayed compared to an output period of an image sensor. For this reason, particularly, when a moving picture is captured, there is a problem in that a blur (a motion blur) is likely to occur in a subject image. Further, since a frame memory used to synchronize frame timings of a plurality of images is necessary, the size of a circuit increases, and thus the cost increases, and the power consumption increases.

DETAILED DESCRIPTION

In general, according to one embodiment, a solid-state imaging device includes a pixel array and a high dynamic range synthesizing circuit. The pixel array includes a plurality of pixels. The pixels are arranged in the horizontal direction and the vertical direction. The pixel array generates signal charges according to a quantity of light incident to each pixel. The high dynamic range synthesizing circuit executes a high dynamic range synthesis using an image signal from the pixel array. A pixel is configured as a small pixel group, and the small pixel group includes a plurality of small pixels. Each of the plurality of small pixels is able to read a signal charge. The small pixel group includes two or more small pixels that differ from each other in optical sensitivity. The small pixel has an opening. The two or more small pixels have different optical sensitivity by changing at least one of the area size of the opening, an electronic shutter time, and an analog gain. The high dynamic range synthesizing circuit includes a valid pixel selecting unit, a sensitivity ratio correcting unit, and a calculation processing unit. The valid pixel selecting unit selects one or two or more small pixels validating a use of a signal value in a high dynamic range synthesis as a valid pixel from the small pixel group. The sensitivity ratio correcting unit executes sensitivity ratio correction on the signal value of each small pixel. The sensitivity ratio correction corrects the signal value according to a ratio of optical sensitivity between small pixels. The calculation processing unit executes a calculation for the high dynamic range synthesis. The calculation processing unit uses the signal value of the valid pixel among the signal values of the small pixels from the sensitivity ratio correcting unit for the calculation.

Exemplary embodiments of a solid-state imaging device and a camera module will be explained below in detail with reference to the accompanying drawings. The present invention is not limited to the following embodiments.

Figure 1:
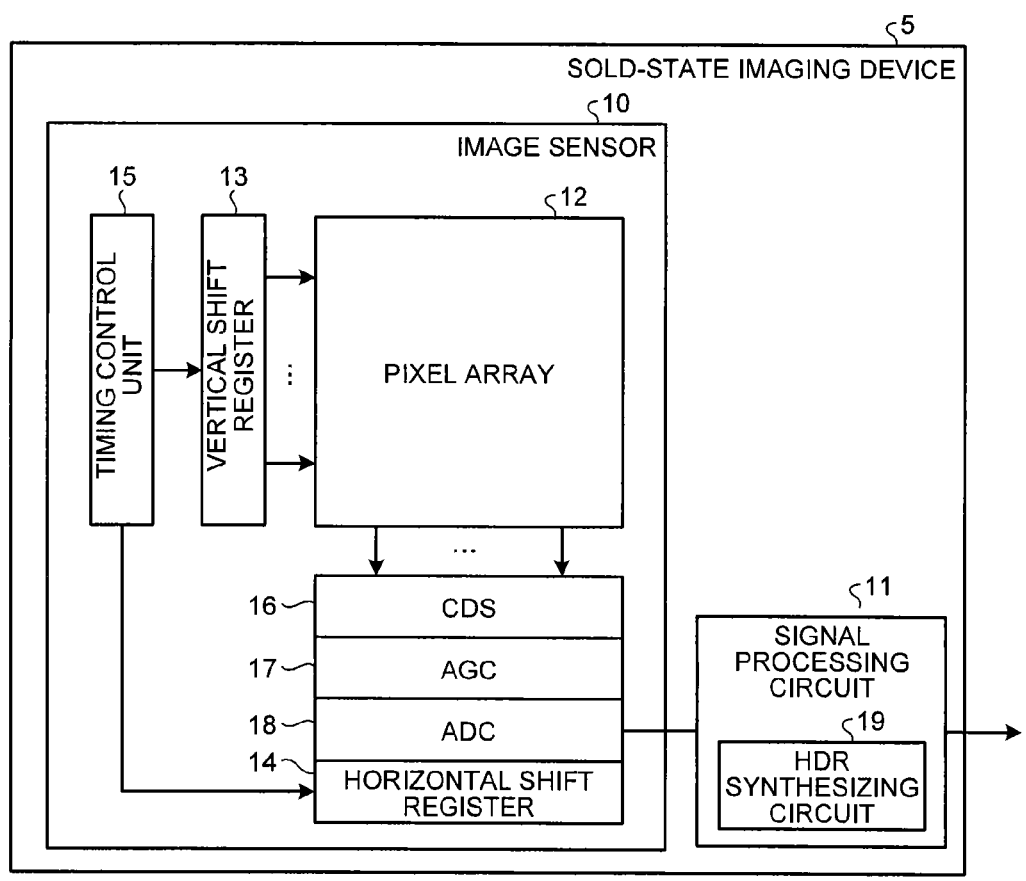
FIG. 1 is a block diagram illustrating a schematic configuration of a solid-state imaging device according to a first embodiment.
Figure 2:
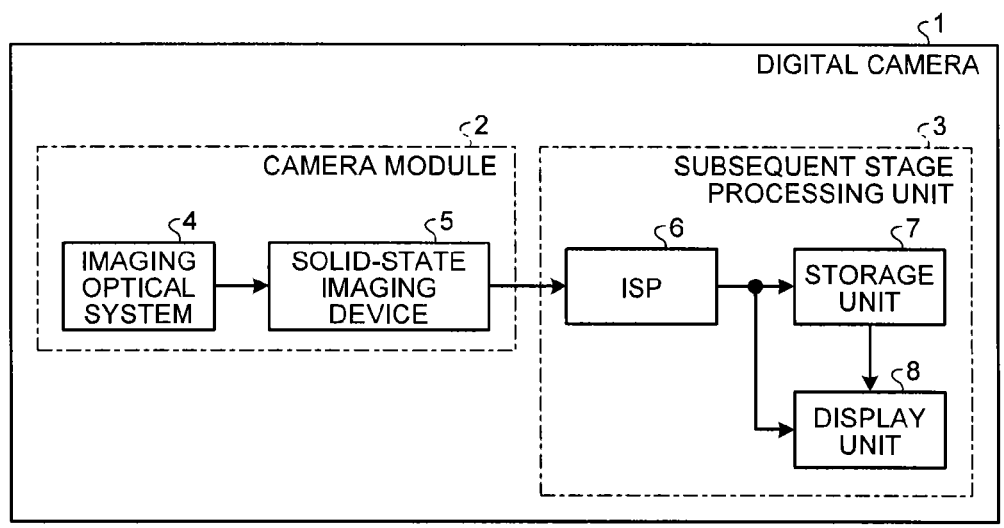
FIG. 2 is a block diagram illustrating a schematic configuration of a digital camera including the solid-state imaging device illustrated in FIG. 1.

FIG. 1 is a block diagram illustrating a schematic configuration of a solid-state imaging device according to a first embodiment. FIG. 2 is a block diagram illustrating a schematic configuration of a digital camera including the solid-state imaging device illustrated in FIG. 1.

A digital camera 1 includes a camera module 2 and a subsequent stage processing unit 3. The camera module 2 includes an imaging optical system 4 and a solid-state imaging device 5. The subsequent stage processing unit 3 includes an image signal processor (ISP) 6, a storage unit 7, and a display unit 8. The camera module 2 is applied to an electronic device such as a mobile phone with a camera as well as the digital camera 1.

The imaging optical system 4 receives light from a subject, and forms a subject image. The solid-state imaging device 5 images the subject image. The ISP 6 executes signal processing on an image signal obtained by imaging by the solid-state imaging device 5. The storage unit 7 stores an image which has been subjected to signal processing by the ISP 6. The storage unit 7 outputs an image signal to the display unit 8 according to a user's operation or the like. The display unit 8 displays an image according to the image signal input from the ISP 6 or the storage unit 7. For example, the display unit 8 includes a liquid crystal display (LCD).

The solid-state imaging device 5 includes a signal processing circuit 11 and an image sensor 10 which is an imaging element. For example, the image sensor 10 includes a complementary metal oxide semiconductor (CMOS) image sensor. The image sensor 10 may include a charge coupled device (CCD) image sensor instead of a CMOS image sensor.

The image sensor 10 includes a pixel array 12, a vertical shift register 13, a horizontal shift register 14, a timing control unit 15, a correlated double sampling (CDS) unit 16, an automatic gain control (AGC) unit 17, and an analog-to-digital converting (ADC) unit 18.

The pixel array 12 is formed on an imaging region of the image sensor 10. The pixel array 12 includes a plurality of pixels which are arranged in an array form in the horizontal direction (the row direction) and the vertical direction (the column direction). Each pixel includes a photodiode which is a photoelectric conversion element. The pixel array 12 generates signal charges according to a quantity of light incident to each pixel.

Figure 3:
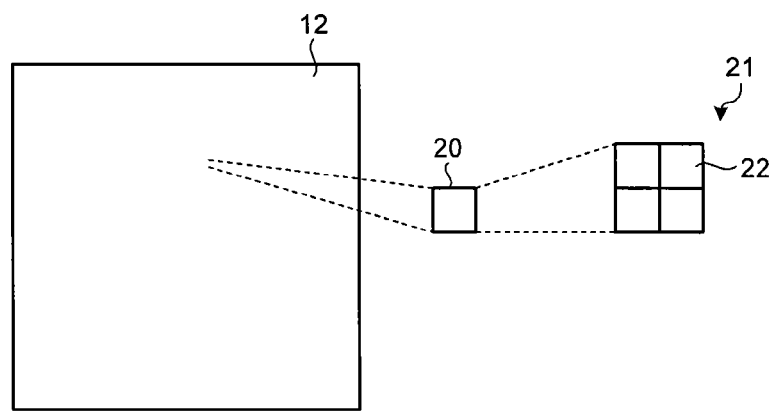
FIG. 3 is a diagram for describing a pixel array, a pixel, and a small pixel.

FIG. 3 is a diagram for describing a pixel array, a pixel, and a small pixel. The pixel 20 configures a small pixel group 21. The small pixel group 21 includes four small pixels 22. In each small pixel group 21, the two small pixels 22 and the two small pixels 22 are arranged in the form of a matrix in the horizontal direction and the vertical direction, respectively. Each small pixel 22 is configured to be able to read a signal charge. The small pixel group 21 includes two or more small pixels 22 that differ from each other in optical sensitivity.

The timing control unit 15 supplies a timing signal indicating a timing for reading a signal from each small pixel 22 of the pixel array 12 to the vertical shift register 13 and the horizontal shift register 14. The vertical shift register 13 selects the small pixels 22 of the pixel array 12 in units of rows according to a vertical synchronous signal which is a timing signal from the timing control unit 15. The vertical shift register 13 outputs a read signal to the small pixels 22 of the selected row.

The small pixel 22 that has received the read signal from the vertical shift register 13 outputs the signal charges accumulated according to a quantity of incident light. The pixel array 12 outputs the signal from the small pixel 22 to the CDS 16 through the vertical signal line. The vertical shift register 13 functions a row selecting circuit that selects a row from which the signal charges are to be read in the pixel array 12.

The CDS 16 performs a CDS process for reducing fixed pattern noise on the signal from the pixel array 12. The AGC 17 amplifies the signal which has been subjected to the CDS process by the CDS 16. The ADC 18 converts the signal amplified by the AGC 17 from an analog format into a digital format. The horizontal shift register 14 sequentially reads the signals of the digital format converted by the ADC 18 according to a horizontal synchronous signal which is a timing signal from the timing control unit 15.

The signal processing circuit 11 executes various kinds of signal processing on the digital image signal read by the horizontal shift register 14. The signal processing circuit 11 includes a high dynamic range (HDR) synthesizing circuit 19. The HDR synthesizing circuit 19 executes the HDR synthesis on the digital image signal input to the signal processing circuit 11. For example, the signal processing circuit 11 executes signal processing such as defect correction, noise reduction, shading correction, and white balance adjustment in addition to the HDR synthesis by the HDR synthesizing circuit 19. The solid-state imaging device 5 outputs the digital image signal which has been subjected to the signal processing by the signal processing circuit 11.

Figure 4:
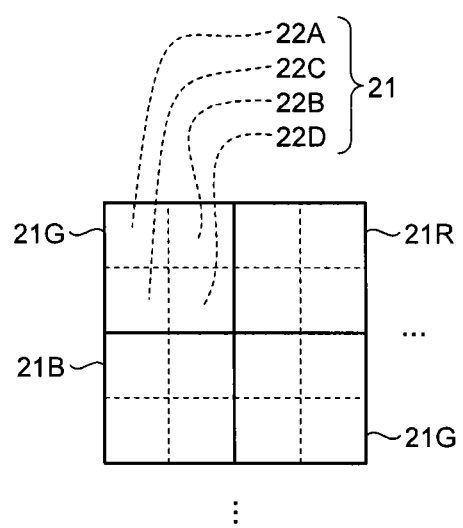
FIG. 4 is a schematic diagram illustrating small pixels arranged in a pixel array.

FIG. 4 is a schematic diagram illustrating the small pixels arranged in the pixel array. For example, the pixel array 12 is configured such that a small pixel group 21R detecting red (R) light, a small pixel group 21G detecting green (G) light, and a small pixel group 21B detecting blue (B) light form the Bayer array.

Four small pixels 22A, 22B, 22C, and 22D configuring the small pixel group 21 are configured to differ from one another in optical sensitivity. In the present embodiment, among the four small pixels 22A, 22B, 22C, and 22D, the small pixel 22A has the highest optical sensitivity. Next to the small pixel 22A, the small pixels 22B, 22C, and 22D decrease in optical sensitivity in the described order. The array form of the small pixels 22A, 22B, 22C, and 22D differing from one another in optical sensitivity is not limited to the array form of the present embodiment, and may have an arbitrary form.

Each small pixel 22 includes an opening through which incident light passes on a light receiving plane. The four small pixels 22A, 22B, 22C, and 22D configuring the small pixel group 21 differ from one another in the area size of the opening. The optical sensitivity of each small pixel 22 depends on the area size of the opening. The solid-state imaging device 5 is not limited to the example in which the optical sensitivity of each small pixel 22 differs according to the area size of the opening. The solid-state imaging device 5 may be configured such that the optical sensitivity of each small pixel 22 differs according to, for example, the electronic shutter time or the analog gain in addition to the area size of the opening.

The solid-state imaging device 5 may be configured such that the optical sensitivity of each small pixel 22 is adjusted according to a combination of two or more of the area size of the opening, the electronic shutter time, the analog gain, and the like. In a setting of the optical sensitivity of each small pixel 22, each of the area size of the opening, the electronic shutter time, and the analog gain can be individually changed. For example, each of the area size of the opening, the electronic shutter time, and the analog gain is adjusted until the solid-state imaging device 5 is shipped.

Figure 5:
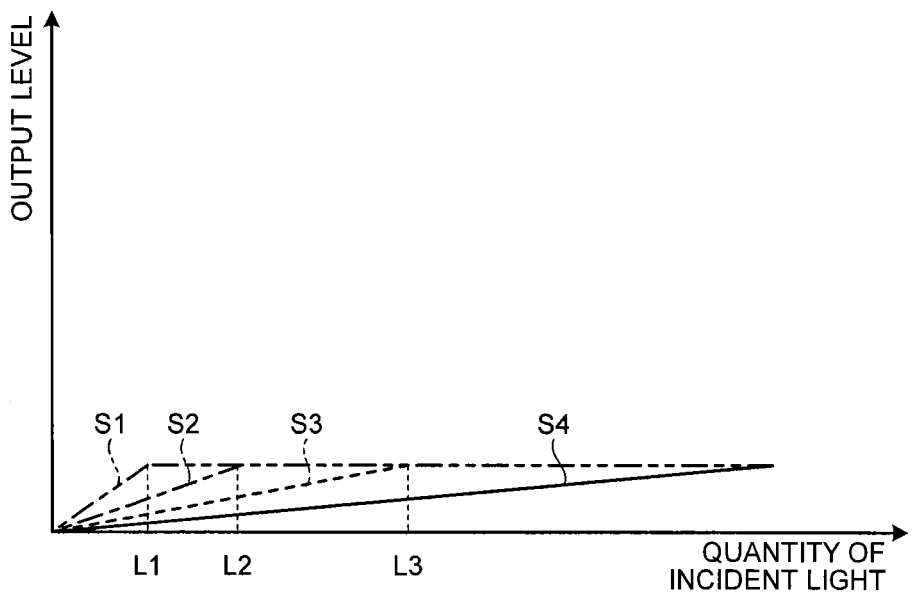
FIGS. 5 and 6 are diagrams for describing a HDR synthesis by a HDR synthesizing circuit.
Figure 6:
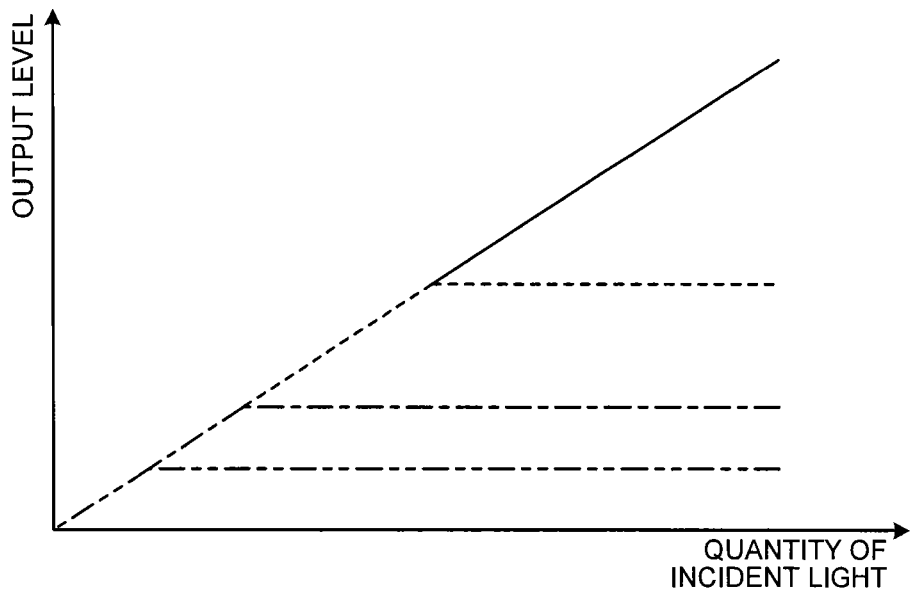

FIGS. 5 and 6 are diagrams for describing the HDR synthesis by the HDR synthesizing circuit. In the graphs illustrated in FIGS. 5 and 6, the vertical axis represents an output level, and the horizontal axis represents a quantity of incident light. When the quantity of light incident to the small pixel 22A becomes a predetermined saturated light quantity L1, signal charges generated by the small pixel 22A are assumed to reach a storage capacity of the photodiode. As illustrated in FIG. 5, when the quantity of incident light is larger than the saturated light quantity L1, the output charges of the small pixel 22A are saturated, and thus an output level of a signal S1 from the small pixel 22A becomes constant.

When the quantity of light incident to the small pixel 22B becomes a predetermined saturated light quantity L2 (L2 is assumed to be larger than L1), the signal charges generated by the small pixel 22B are assumed to reach the storage capacity of the photodiode. When the quantity of incident light is larger than the saturated light quantity L2, the output charges of the small pixel 22B are saturated, and thus an output level of a signal S2 from the small pixel 22B becomes constant.

When the quantity of light incident to the small pixel 22C becomes a predetermined saturated light quantity L3 (L3 is assumed to be larger than L2), the signal charges generated by the small pixel 22C are assumed to reach the storage capacity of the photodiode. When the quantity of incident light is larger than the saturated light quantity L3, the output charges of the small pixel 22C are saturated, and thus an output level of a signal S3 from the small pixel 22C becomes constant. An output level of a signal S4 from the small pixel 22D increases as the quantity of incident light increases even when the saturated light quantity L3 of the small pixel 22C is larger than the quantity of incident light.

Here, an optical sensitivity ratio SR1:SR2:SR3:SR4 of the small pixels 22A, 22B, 22C, and 22D is referred to as a "sensitivity ratio." In the present embodiment, SR1>SR2>SR3>SR4 is assumed. The HDR synthesizing circuit 19 executes sensitivity ratio correction in order to make the output levels of the small pixels 22A, 22B, 22C, and 22D match one another.

The HDR synthesizing circuit 19 executes the HDR synthesis based on addition of S1 and S2 when the quantity of incident light is larger L1 and is L2 or less. At the time of the HDR synthesis, the HDR synthesizing circuit 19 multiplies S2 by a correction value M2 (=SR1/SR2) for the sensitivity ratio correction in order to make the output level of the small pixel 22B match the output level of the small pixel 22A.

The HDR synthesizing circuit 19 executes the HDR synthesis of adding (S1+M2×S2) by S3 when the quantity of incident light is larger L2 and is L3 or less. At the time of the HDR synthesis, the HDR synthesizing circuit 19 multiplies S3 by a correction value M3 (=SR1/SR3) for the sensitivity ratio correction in order to make the output level of the small pixel 22C match the output level of the small pixel 22A.

The HDR synthesizing circuit 19 executes the HDR synthesis of adding (S1+M2×S2+M3×S3) by S4 when the quantity of incident light is larger L3. At the time of the HDR synthesis, the HDR synthesizing circuit 19 multiplies S4 by a correction value M4 (=SR1/SR4) for the sensitivity ratio correction in order to make the output level of the small pixel 22D match the output level of the small pixel 22A.

Through the above operation, the HDR synthesizing circuit 19 obtains a HDR synthetic signal. When the quantity of incident light is L1 or less, the HDR synthesizing circuit 19 outputs S1 without executing the HDR synthesis. The correction value M1 on S1 is assumed to 1. For example, when SR1 is 1, SR2 is set to ½, SR3 is set to ¼, and SR4 is set to ⅛, M2 is assumed to be 2, M3 is assumed to be 4, and M4 is assumed to be 8.

The solid-state imaging device 5 is able to perform imaging in a wide dynamic range by the HDR synthesis by the HDR synthesizing circuit 19. The solid-state imaging device 5 can obtain a high-quality image by reducing both underexposure in a portion of a subject having low brightness and overexposure in a portion having high brightness. By executing the HDR synthesis using the small pixel 22, the solid-state imaging device 5 can obtain a synthetic image having the resolution equal to the pixel 20 in the pixel array 12.

Figure 7:
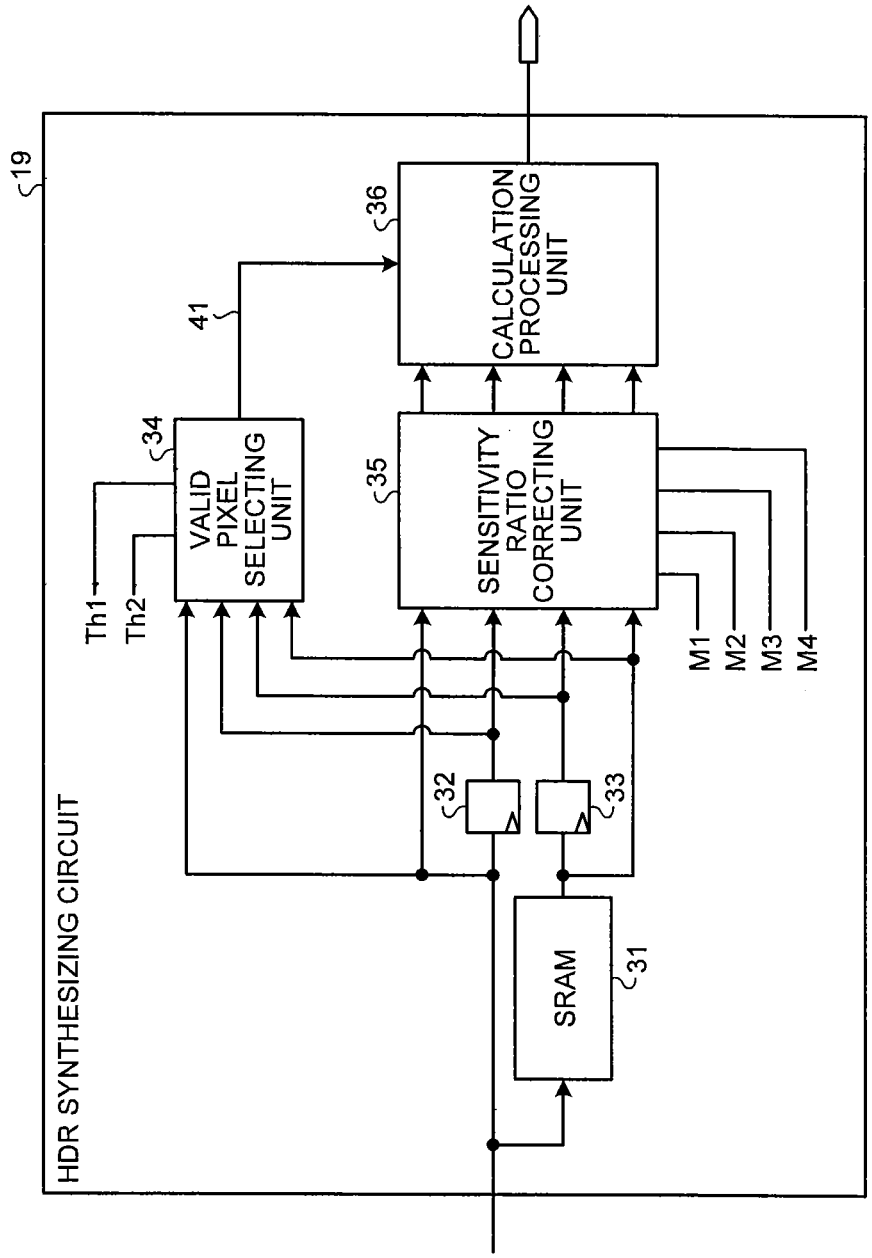
FIG. 7 is a block diagram illustrating a configuration of a HDR synthesizing circuit.

FIG. 7 is a block diagram illustrating a configuration of the HDR synthesizing circuit. The HDR synthesizing circuit 19 includes a static random access memory (SRAM) 31, flip flops (FF) 32 and 33, a valid pixel selecting unit 34, a sensitivity ratio correcting unit 35, and a calculation processing unit 36.

The SRAM 31 holds a digital image signal input to the HDR synthesizing circuit 19. The SRAM 31 is a line memory holding a single horizontal line. The horizontal line refers to an image signal from a row formed by arranging the small pixels 22 in a row in the horizontal direction. The SRAM 31 delays an image signal in the vertical direction.

The FFs 32 and 33 sequentially delay a signal of each small pixel 22. The FFs 32 and 33 delay the image signal in the horizontal direction. The SRAM 31 and the FFs 32 and 33 synchronize the signals from the four small pixels 22A, 22B, 22C, and 22D for each small pixel group 21.

The synchronized four signals are input to the valid pixel selecting unit 34. The valid pixel selecting unit 34 selects one or more valid pixels from the four small pixels 22A, 22B, 22C, and 22D of the small pixel group 21. The valid pixel refers to the small pixel 22 validating the use of the signal value in the HDR synthesis.

Figure 8:
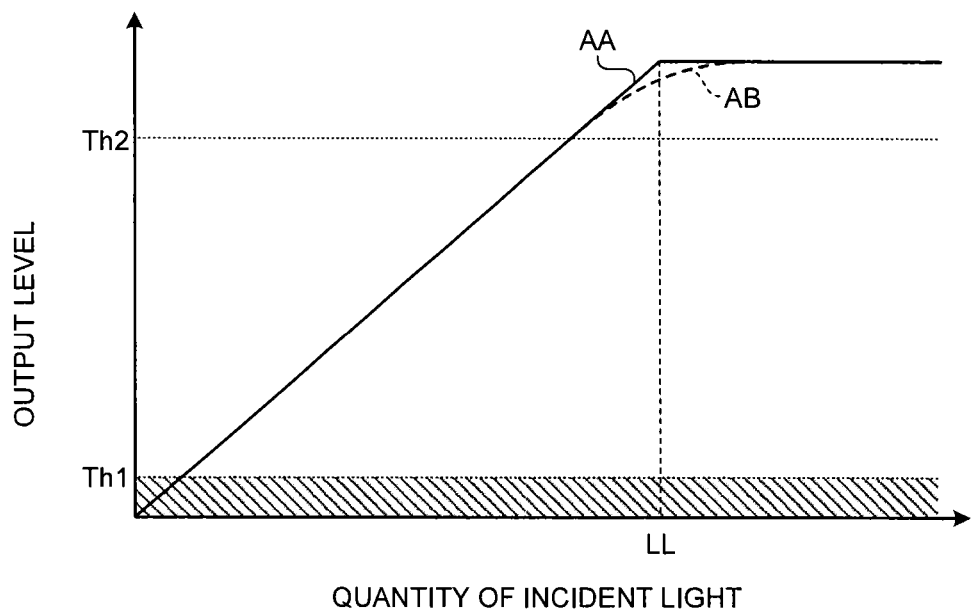
FIG. 8 is a diagram for describing a threshold value used to select a valid pixel.

FIG. 8 is a diagram for describing a threshold value used to select a valid pixel. As the quantity of incident light increases from zero, the output level of the small pixel 22 increases almost in proportion to the quantity of incident light. After the quantity of incident light reaches a predetermined saturated light quantity LL, the output level of the small pixel 22 converges to a constant value.

In the graph of FIG. 8, a solid line AA represents an ideal output characteristic of the small pixel 22. According to the ideal output characteristic, when the quantity of incident light is between zero and LL, a desirable proportional relation is formed between the output level of the small pixel 22 and the quantity of incident light. Further, according to the ideal output characteristic of the small pixel 22, the output level of the small pixel 22 immediately becomes constant at a point in time at which the quantity of incident light exceeds LL.

When the quantity of incident light is close to zero, the output level of the small pixel 22 is significantly affected by a noise component. For this reason, when the quantity of incident light is close to zero, the output level of the small pixel 22 may not have a sufficient proportional relation with the quantity of incident light or may be buried in the noise component.

A dashed line AB representing a relation between when the quantity of incident light is slightly smaller than LL and when the quantity of incident light is slightly larger than LL represents a realistic output characteristic of the small pixel 22. In the case of the realistic output characteristic, the quantity of incident light increases from a level smaller than LL. After quantity of incident light reaches the level slightly smaller than LL, the output level of the small pixel 22 is deviated to a level side lower than the proportional relation straight line.

Even after the quantity of incident light reaches LL, the output level of the small pixel 22 gently increases deviated from the ideal output characteristic. After the quantity of incident light slightly exceeds LL, the output level of the small pixel 22 becomes constant. For example, the deviation on the ideal output characteristic occurs due to influence of the knee characteristic.

Th1 represents a first threshold value set to a low output level when the quantity of incident light is close to zero. Th1 is set to remove the small pixel 22 with a low output level that is likely to be affected by the noise component from a HDR synthesis target. Th2 represents a second threshold value set to a high output level when the quantity of incident light is close to LL. Th2 is set to remove the small pixel 22 with a high output level in which the proportion relation with the quantity of incident light is likely to be aggravated from a HDR synthesis target.

The valid pixel selecting unit 34 selects the small pixel 22 having the signal value included in a range between Th1 and Th2 set to the output level higher than Th1 as the valid pixel. For example, the HDR synthesizing circuit 19 holds Th1 and Th2 which are set in advance.

Figure 9:
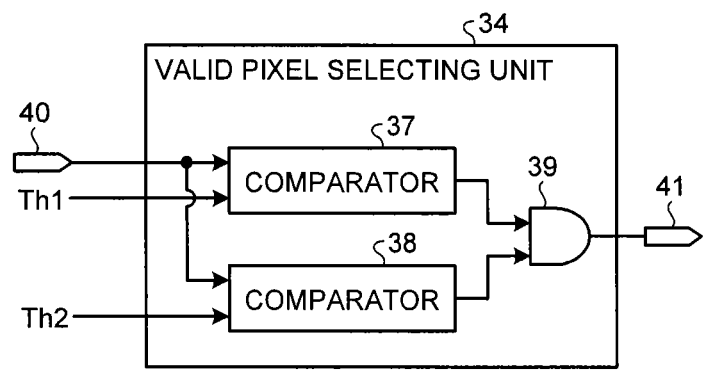
FIG. 9 is a block diagram illustrating a configuration of a valid pixel selecting unit.

FIG. 9 is a block diagram illustrating a configuration of the valid pixel selecting unit. The valid pixel selecting unit 34 includes comparators 37 and 38 and an AND circuit 39. The synchronized four signals are input to the valid pixel selecting unit 34 as input data 40. The comparator 37 compares the input data 40 with Th1. For example, when the input data 40 is larger than Th1, the comparator 37 outputs "1." When the input data 40 is Th1 or less, the comparator 37 outputs "0."

The comparator 38 compares the input data 40 with Th2. For example, when the input data 40 is smaller than Th2, the comparator 38 outputs "1." When the input data 40 is Th2 or more, the comparator 38 outputs "0."

The AND circuit 39 calculates a logical product of an output from the comparator 37 and an output from the comparator 38. The AND circuit 39 calculates a logical product on each of the four signals which are input data. A logical product "1" represents that the small pixel 22 that has output the signal is the valid pixel. A logical product "0" represents that the small pixel 22 that has output the signal is not the valid pixel. The valid pixel selecting unit 34 outputs 4-bit information representing whether the small pixels 22A, 22B, 22C, and 22D are the valid pixel as a selection signal 41.

Preferably, as a condition under which the valid pixel selecting unit 34 selects the valid pixel, used is a condition that is satisfied both or either of when the signal value is larger than Th1 and when the signal value is smaller than Th2. Preferably, the valid pixel selecting unit 34 selects the valid pixel according to a result of comparing the signal value of the small pixel 22 with at least one of Th1 and Th2 which are set in advance.

The synchronized four signals are input to the sensitivity ratio correcting unit 35. The sensitivity ratio correcting unit 35 executes the sensitivity ratio correction on each of the signal values of the four small pixels 22A, 22B, 22C, and 22D. The sensitivity ratio correcting unit 35 multiplies the signal values of the small pixels 22A, 22B, 22C, and 22D by the correction values M1, M2, M3, and M4, respectively.

The calculation processing unit 36 executes a calculation for the HDR synthesis using the signal value of the valid pixel among the signal values of the small pixels 22 from the sensitivity ratio correcting unit 35. The calculation processing unit 36 executes a filter calculation of extracting the signal values represented as "1" in the selection signal 41 among the signal values of the small pixels 22 and averaging the extracted signal values. The HDR synthesizing circuit 19 outputs the calculation result of the calculation processing unit 36 as the HDR synthetic signal.

Figure 10:
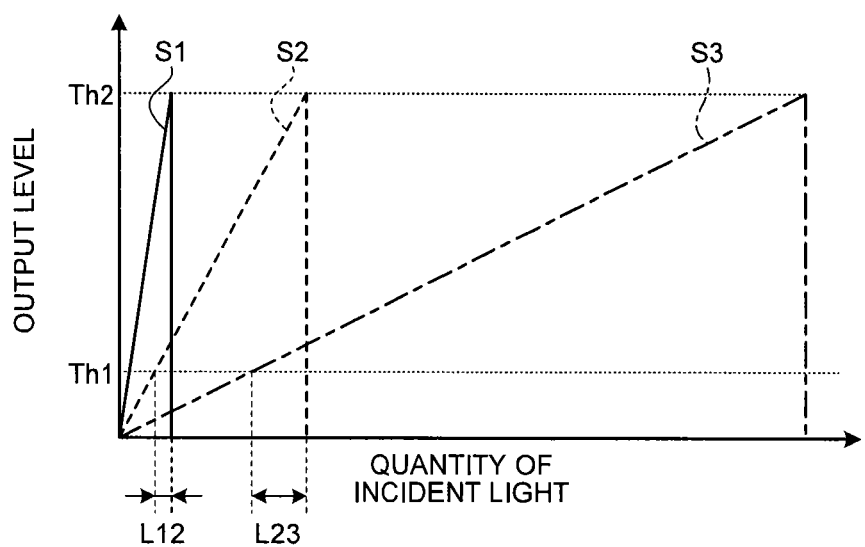
FIG. 10 is a diagram for describing an output characteristic of a small pixel and a HDR synthesis.

FIG. 10 is a diagram for describing an output characteristic of the small pixel and the HDR synthesis. FIG. 10 illustrates a relation between the output level and the quantity of incident light on the signals S1, S2, and S3 of the three small pixels 22A, 22B, and 22C.

The range of the quantity of incident light in which the signal S2 of the small pixel 22B has the low output level overlaps the whole range in which the small pixel 22A can output the signal S1 according to the quantity of incident light. In the range of the quantity of incident light, in L12, both the output levels of the signals S1 and S2 are within the range from Th1 to Th2 and satisfy the condition of the valid pixel. When the quantity of incident light is within the range of L12, the HDR synthesizing circuit 19 executes the HDR synthesis using the signals S1 and S2. When the quantity of incident light is lower than the range of L12, the HDR synthesizing circuit 19 executes the HDR synthesis using the signal S1.

The range of the quantity of incident light in which the signal S3 of the small pixel 22C has the low output level overlaps the whole range in which the small pixel 22B can output the signal S2 according to the quantity of incident light. In the range of the quantity of incident light, in L23, both the output levels of the signals S2 and S3 are within the range from Th1 to Th2 and satisfy the condition of the valid pixel. When the quantity of incident light is within the range of L23, the HDR synthesizing circuit 19 executes the HDR synthesis using the signals S2 and S3. When the quantity of incident light is higher than the range of L12 and lower than the range of L23, the HDR synthesizing circuit 19 executes the HDR synthesis using the signal S2. When the quantity of incident light is higher than the range of L23, the HDR synthesizing circuit 19 executes the HDR synthesis using the signal S3.

The output characteristics of the small pixels 22A, 22B, 22C, and 22D are set such that the range in which all the small pixels 22, which overlap each other in the range of the quantity of incident light in which the signal according to the quantity of incident light can be output, satisfy the condition of the valid pixel is present. For example, in the case of the small pixels 22A and 22B, the range L12 in which both the small pixels 22A and 22B satisfy the condition of the valid pixel is included in the range of the quantity of incident light in which both the small pixels 22A and 22B can output the signal according to the quantity of incident light.

Further, the HDR synthesizing circuit 19 is not limited to one which executes the HDR synthesis based on the signal from the small pixel 22 of the small pixel group 21 and the HDR synthesis based on the signals from the two small pixels 22. The HDR synthesizing circuit 19 may execute the HDR synthesis based on the signals from the three or more small pixels 22.

The present embodiment is not limited to the example in which the number of small pixels 22 included in the small pixel group 21 is four. Preferably, the small pixel group 21 includes the two or more small pixels 22 that differ from each other in optical sensitivity. The small pixel group 21 may add a signal to any of a plurality of small pixels 22. In this case, the small pixels 22 to be added may have the same optical sensitivity.

For example, the solid-state imaging device 5 adds the signal by the output from the small pixel 22A and the signal by the output from the small pixel 22C among the four small pixels 22A, 22B, 22C, and 22D configuring the small pixel group 21. For example, addition of the signals is performed by the signal processing circuit 11. The solid-state imaging device 5 uses a signal obtained by adding the signals from the small pixels 22A and 22C for the HDR synthesis as the image signal by high-sensitive optical detection. In this case, the solid-state imaging device 5 can perform imaging in the wide dynamic range by the HDR synthesis of the HDR synthesizing circuit 19.

According to the first embodiment, the HDR synthesizing circuit 19 uses the signal value of the small pixel 22 selected as the valid pixel in the valid pixel selecting unit 34 for the HDR synthesis, and thus the accuracy of the HDR synthesis can be improved. When the small pixel 22 used for the HDR synthesis is changed according to the quantity of incident light, the HDR synthesizing circuit 19 can secure sufficient continuity to the quantity of incident light on the output after the HDR synthesis.

The HDR synthesizing circuit 19 selects the valid pixel using the first threshold value Th1, and thus the HDR synthetic signal which is less affected by the noise component can be obtained. The HDR synthesizing circuit 19 selects the valid pixel using the second threshold value Th2, and thus it is possible to suppress adverse effects caused by the deviation of the output characteristic that may occur when the quantity of incident light is close to the saturated light quantity.

When the HDR synthesis is executed based on the signals from the two or more small pixels 22, the HDR synthesizing circuit 19 executes the HDR synthesis under the condition that all the small pixels 22 are the valid pixel. In the process in which the small pixel 22 whose signal value is used for the HDR synthesis is changed due to a change in the quantity of incident light, using the signals of the two or more small pixels 22 which are the valid pixels for the HDR synthesis, the high accuracy of the HDR synthesis can be constantly maintained on the change in the quantity of incident light.

As described above, the solid-state imaging device 5 can perform the effective HDR synthesis in the HDR synthesizing circuit 19, and thus there is an effect by which the high-quality HDR synthetic image can be obtained.

Figure 11:
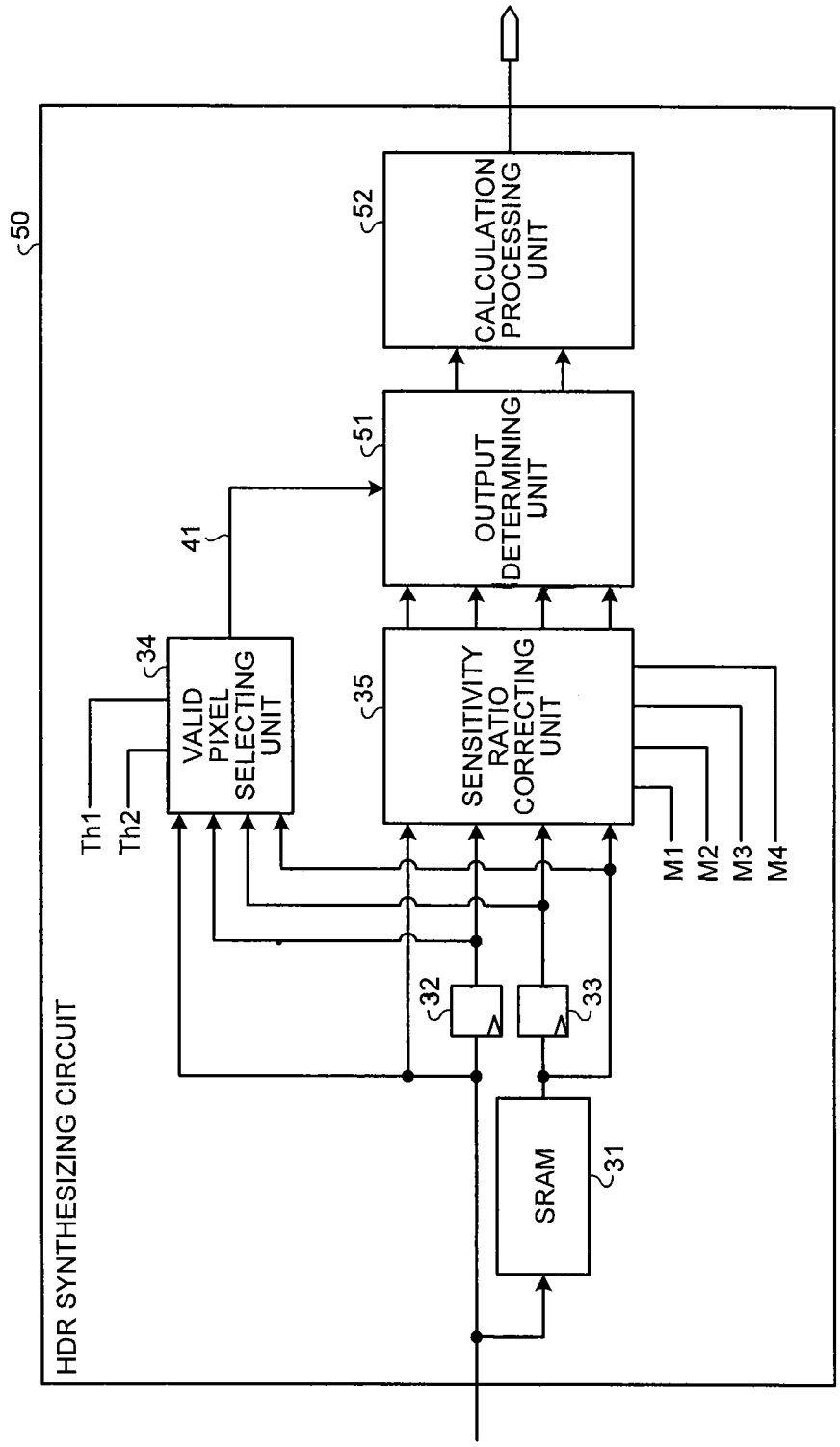
FIG. 11 is a block diagram illustrating a configuration of a HDR synthesizing circuit included in a solid-state imaging device according to a second embodiment.

FIG. 11 is a block diagram illustrating a configuration of a HDR synthesizing circuit included in a solid-state imaging device according to a second embodiment. The same components as in the first embodiment are denoted by the same reference numerals, and a redundant description thereof will not be repeated.

An output determining unit 51 executes an output determination on the signal value that has been subjected to the sensitivity ratio correction by the sensitivity ratio correcting unit 35. The calculation processing unit 52 executes a calculation for the HDR synthesis using the signal values of the small pixels 22 from the output determining unit 51.

Figure 12:
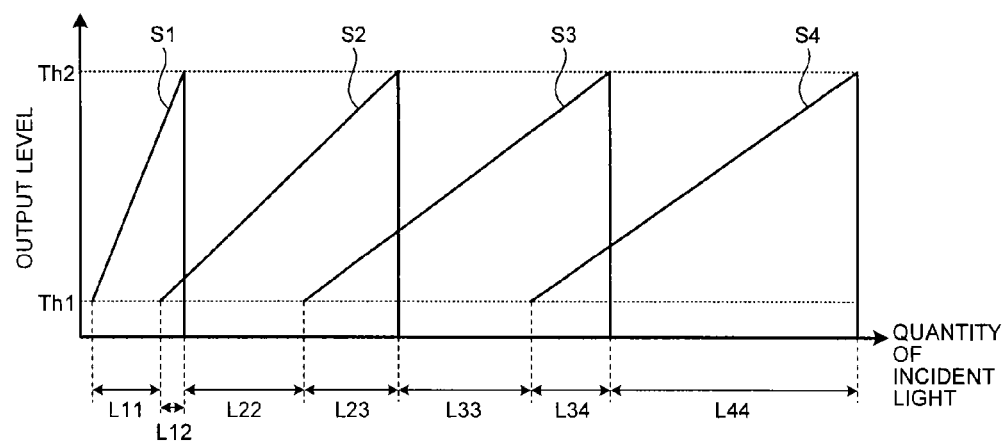
FIG. 12 is a diagram for describing an output characteristic of a small pixel and selection of a valid pixel in a valid pixel selecting unit.

FIG. 12 is a diagram for describing an output characteristic of the small pixel and selection of the valid pixel in the valid pixel selecting unit. When the quantity of incident light is within a range of L11, the valid pixel selecting unit 34 selects the small pixel 22A that outputs S1 as the valid pixel (a first selection pattern). When the quantity of incident light is within a range of L12, the valid pixel selecting unit 34 selects two pixels of the small pixel 22A and the small pixel 22B that outputs S2 as the valid pixel (a second selection pattern).

When the quantity of incident light is within a range of L22, the valid pixel selecting unit 34 selects the small pixel 22B as the valid pixel (a third selection pattern). When the quantity of incident light is within a range of L23, the valid pixel selecting unit 34 selects two pixels of the small pixel 22B and the small pixel 22C that outputs S3 as the valid pixel (a fourth selection pattern). When the quantity of incident light is within a range of L33, the valid pixel selecting unit 34 selects the small pixel 22C as the valid pixel (a fifth selection pattern).

When the quantity of incident light is within a range of L34, the valid pixel selecting unit 34 selects two pixels of the small pixel 22C and the small pixel 22D that outputs S4 as the valid pixel (a sixth selection pattern). When the quantity of incident light is within a range of L44, the valid pixel selecting unit 34 selects the small pixel 22D as the valid pixel (a seventh selection pattern).

Figure 13:
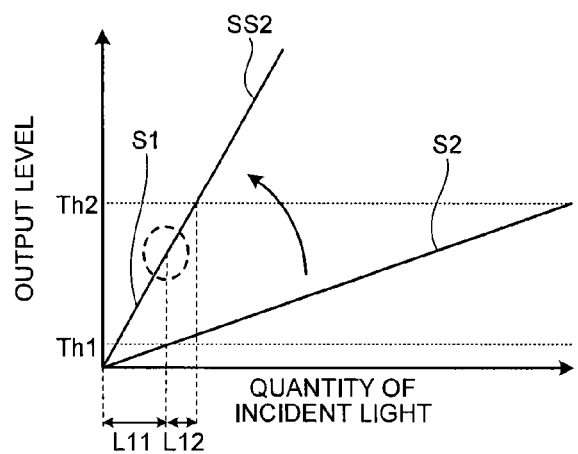
FIG. 13 is a diagram for describing deviation of an output characteristic that may occur due to sensitivity ratio correction.
Figure 14:
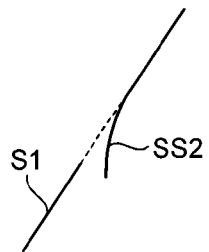
FIG. 14 is an enlarged view illustrating a part of FIG. 13.

FIG. 13 is a diagram for describing deviation of an output characteristic that may occur due to the sensitivity ratio correction. FIG. 14 is an enlarged view illustrating a part of FIG. 13. A relation between the output level of the signal of the small pixel 22 and the quantity of incident light may be slightly deviated due to influence of the sensitivity ratio correction.

For example, in the case of the signal S2 of the small pixel 22B, when a signal SS2 obtained by executing the sensitivity ratio correction on the signal S2 is compared with the signal S1 of the small pixel 22A based on the relation between the output level and the quantity of incident light, there are cases in which deviation on the signal S1 appears in the signal SS2. This deviation appears such that the graph of SS2 is discontinuous to the graph of S1 in the boundary between L11 and L12. FIG. 14 is an enlarged view of a part surrounded by a dashed line in FIG. 13.

The deviation of the output characteristic caused by influence of the sensitivity ratio correction may become outstanding depending on the correction value used for the sensitivity ratio correction. The output determining unit 51 executes an output determination for removing the small pixel 22 in which the deviation by the sensitivity ratio correction is outstanding from the HDR synthesis target.

Figure 15:
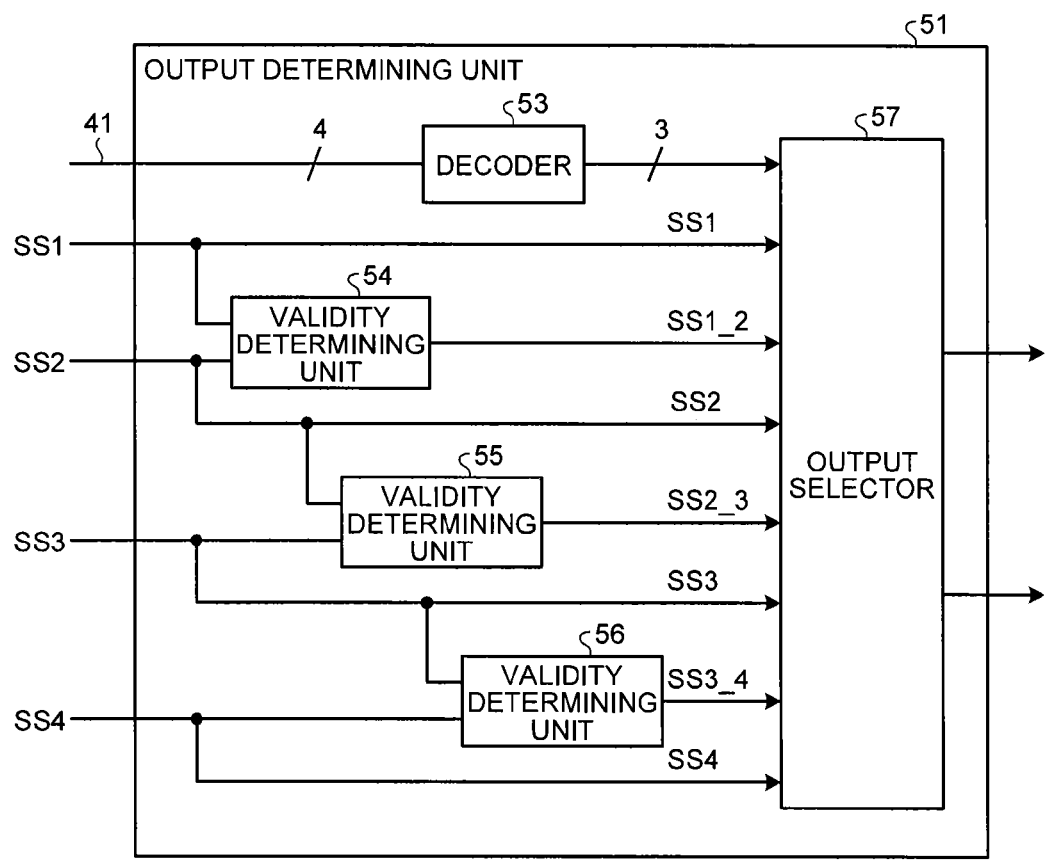
FIG. 15 is a block diagram illustrating a configuration of an output determining unit.

FIG. 15 is a block diagram illustrating a configuration of the output determining unit. The output determining unit 51 includes a decoder 53, validity determining units 54, 55, and 56, and an output selector 57. The selection signal 41 from the valid pixel selecting unit 34 and signals SS1, SS2, SS3, and SS4 from the sensitivity ratio correcting unit 35 are input to the output determining unit 51. The signals SS1, SS2, SS3, and SS4 refer to S1, S2, S3, and S4 that have been subjected to the sensitivity ratio correcting unit 35, respectively.

The decoder 53 converts the 4-bit selection signal 41 from the valid pixel selecting unit 34 into a 3-bit signal. The first to seventh selection patterns selected by the valid pixel selecting unit 34 are represented by the 3-bit selection signal 41 from the decoder 53.

The signals SS1 and SS2 are input to the validity determining unit 54. When the two small pixels 22A and 22B are selected as the valid pixels, the validity determining unit 54 determines whether the small pixel 22B is to be included as the HDR synthesis target.

Figure 16:
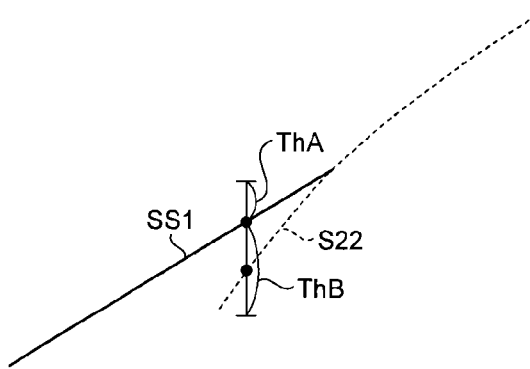
FIG. 16 is a diagram for describing determination in a validity determining unit.

FIG. 16 is a diagram for describing the determination in the validity determining unit. Of the small pixels 22A and 22B, the validity determining unit 54 sets the small pixel 22A having the high sensitivity as a reference of determination. The validity determining unit 54 determines whether the signal SS2 of the small pixel 22B is included in the range between ThA positioned at a positive side based on the signal SS1 of the small pixel 22A and ThB positioned at a negative side. The output determining unit 51 holds ThA and ThB which are determination threshold values in advance.

When the signal SS2 is included in the range from ThA to ThB, the validity determining unit 54 determines that the small pixel 22B is to be included as the HDR synthesis target. When the signal SS2 is not included in the range from ThA to ThB, the validity determining unit 54 determines that the small pixel 22B is not to be included as the HDR synthesis target. The output determining unit 51 may set the same determination threshold value at the positive side and the negative side.

When the signal value SS2 of another valid pixel that has been subjected to the sensitivity ratio correction is not included within the range of the output level set to include the signal value SS1 of the valid pixel serving as the reference, the output determining unit 51 determines that the small pixel 22B which is the another valid pixel is invalid as the HDR synthesis target.

Figure 17:
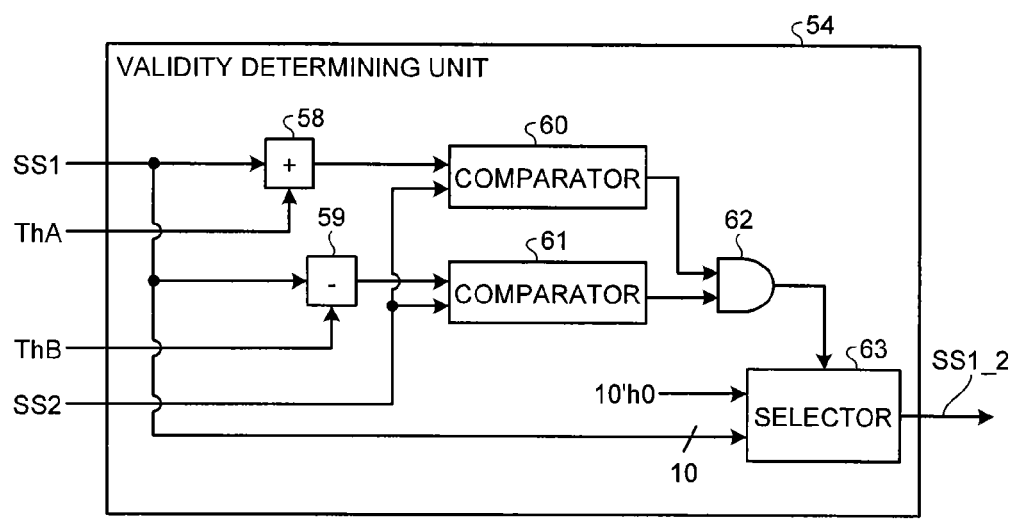
FIG. 17 is a block diagram illustrating a configuration of a validity determining unit.

FIG. 17 is a block diagram illustrating a configuration of the validity determining unit. The validity determining unit 54 includes an adder 58, a subtractor 59, comparators 60 and 61, an AND circuit 62, and a selector 63. The adder 58 adds ThA to SS1. The subtractor 59 subtracts ThB from SS1.

The comparator 60 compares the addition result (SS1+ThA) of the adder 58 with SS2. For example, when (SS1+ThA)>SS2 is established, the comparator 60 outputs "1." When (SS1+ThA)>SS2 is not established, the comparator 60 outputs "0."

The comparator 61 compares the subtraction result (SS1−ThB) of the subtractor 59 with SS2. For example, when SS2>(SS1−ThB) is established, the comparator 61 outputs "1." When SS2>(SS1−ThB) is not established, the comparator 61 outputs "0."

The AND circuit 62 calculates a logical product of an output from the comparator 60 and an output from the comparator 61. A logical product "1" represents that SS2 is included within the range of the determination threshold values ThA and ThB. A logical product "0" represents that SS2 is not included within the range of the determination threshold values ThA and ThB.

The selector 63 selects either of the signal SS1 and the zero level signal (10'h0) using a signal from the AND circuit 62 as a selection control input signal. The zero level signal is a signal representing the black level which is the lowest gradation or a level lower than the black level. The selector 63 selects SS1 according to the selection control input signal "1." The selector 63 selects the zero level signal according to the selection control input signal "0." The validity determining unit 54 outputs the selection result in the selector 63 as a signal SS1_2.

The validity determining units 55 and 56 have the same configuration as the validity determining unit 54. The signals SS2 and SS3 are input to the validity determining unit 55. When the two small pixels 22B and 22C are selected as the valid pixels, the validity determining unit 55 determines whether the small pixel 22C is to be included as the HDR synthesis target by a calculation. Of the small pixels 22B and 22C, the validity determining unit 55 sets the small pixel 22B having high sensitivity as a reference of determination.

When SS3 is included within the range from ThA to ThB, the validity determining unit 55 determines that the small pixel 22C is to be included as the HDR synthesis target. When SS3 is not included within the range from the determination threshold value ThA to the determination threshold value ThB, the validity determining unit 55 determines that the small pixel 22C is not to be included as the HDR synthesis target. The validity determining unit 55 outputs the selected one of SS3 and the zero level signal as a signal SS2_3.

The signals SS3 and SS4 are input to the validity determining unit 56. When the two small pixels 22C and 22D are selected as the valid pixels, the validity determining unit 56 determines whether the small pixel 22D is to be included as the HDR synthesis target by a calculation. Of the small pixels 22C and 22D, the validity determining unit 56 sets the small pixel 22C having high sensitivity as a reference of determination.

When SS4 is included within the range from ThA to ThB, the validity determining unit 56 determines that the small pixel 22D is to be included as the HDR synthesis target. When SS4 is not included within the range from ThA to ThB, the validity determining unit 56 determines that the small pixel 22D is not to be included as the HDR synthesis target. The validity determining unit 56 outputs the selected one of SS4 and the zero level signal as a signal SS3_4.

The selection signal 41 from the decoder 53, SS1, SS1_2, SS2, SS2_3, SS3, SS3_4, and SS4 are input to the output selector 57. When the selection signal 41 representing the first selection pattern is input from the decoder 53, the output selector 57 selects SS1 as an output. When the selection signal 41 representing the third selection pattern is input from the decoder 53, the output selector 57 selects SS2 as an output. When the selection signal 41 representing the fifth selection pattern is input from the decoder 53, the output selector 57 selects SS3 as an output. When the selection signal 41 representing the seventh selection pattern is input from the decoder 53, the output selector 57 selects SS4 as an output.

When the selection signal 41 representing the second selection pattern is input and SS1 is input as SS1_2, the output selector 57 selects SS1 and SS2 as an output. When the selection signal 41 representing the second selection pattern is input and the zero level signal is input as SS1_2, the output selector 57 selects SS1 and the zero level signal as an output. When the small pixel 22B is determined as be invalid as the HDR synthesis target, the output determining unit 51 outputs the zero level signal instead of SS2 on the small pixel 22B.

When the selection signal 41 representing the fourth selection pattern is input and SS2 is input as SS2_3, the output selector 57 selects SS2 and SS3 as an output. When the selection signal 41 representing the fourth selection pattern is input and the zero level signal is input as SS2_3, the output selector 57 selects SS2 and the zero level signal as an output. When the small pixel 22C is determined as be invalid as the HDR synthesis target, the output determining unit 51 outputs the zero level signal instead of SS3 on the small pixel 22C.

When the selection signal 41 representing the sixth selection pattern is input and SS3 is input as SS3_4, the output selector 57 selects SS3 and SS4 as an output. When the selection signal 41 representing the sixth selection pattern is input and the zero level signal is input as SS3_4, the output selector 57 selects SS3 and the zero level signal as an output. When the small pixel 22D is determined as be invalid as the HDR synthesis target, the output determining unit 51 outputs the zero level signal instead of SS4 on the small pixel 22D.

Figure 18:
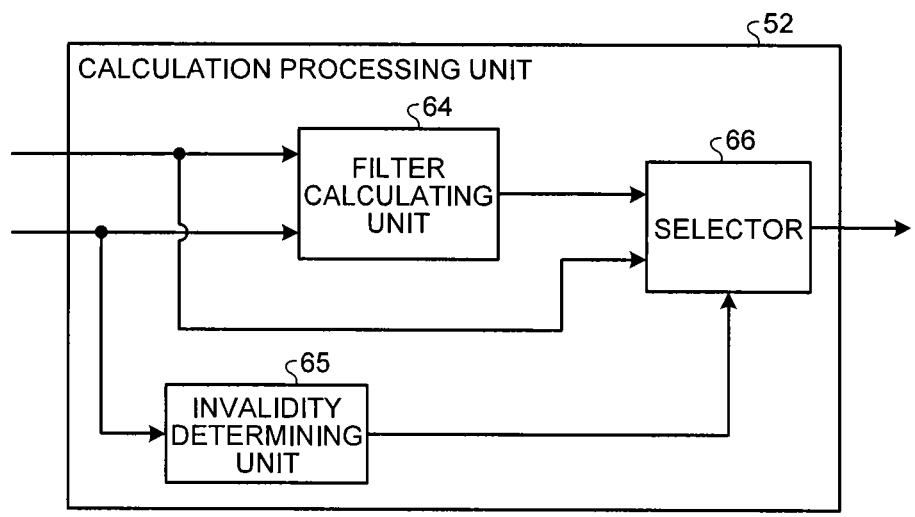
FIG. 18 is a block diagram illustrating a configuration of a calculation processing unit.

FIG. 18 is a block diagram illustrating a configuration of the calculation processing unit. The calculation processing unit 52 includes a filter calculating unit 64, an invalidity determining unit 65, and a selector 66. The filter calculating unit 64 executes a filter calculation of averaging input signals. The invalidity determining unit 65 determines whether the calculation result of the filter calculating unit 64 is dealt to be invalid according to the presence or absence of the zero level signal. The selector 66 selects either a signal that has been subjected to the filter calculation of the filter calculating unit 64 or a signal that is not input to the filter calculating unit 64 yet.

One or two signals from the output determining unit 51 are input to the calculation processing unit 52. When one signal SS1 from the output determining unit 51 is input, the filter calculating unit 64 and the selector 66 allow SS1 to directly pass through. As a result, the calculation processing unit 52 outputs SS1 in the first selection pattern. When one signal SS2 from the output determining unit 51 is input, the filter calculating unit 64 and the selector 66 allow SS2 to directly pass through. As a result, the calculation processing unit 52 outputs SS2 as the HDR synthetic signal in the third selection pattern.

When one signal SS3 from the output determining unit 51 is input, the filter calculating unit 64 and the selector 66 allow SS3 to directly pass through. As a result, the calculation processing unit 52 outputs SS3 as the HDR synthetic signal in the fifth selection pattern. When one signal SS4 from the output determining unit 51 is input, the filter calculating unit 64 and the selector 66 allow SS4 to directly pass through. As a result, the calculation processing unit 52 outputs SS4 as the HDR synthetic signal in the seventh selection pattern.

When the two signals SS1 and SS2 are input from the output determining unit 51, the filter calculating unit 64 executes the filter calculation of SS1 and SS2. For example, the invalidity determining unit 65 outputs "1" as the zero level signal is not input from the output determining unit 51. The selector 66 selects the signal from the filter calculating unit 64 according to the selection control input signal "1" from the invalidity determining unit 65. As a result, when it is the second selection pattern and the output determining unit 51 determines that SS2 is valid, the calculation processing unit 52 outputs a result of the process of averaging SS1 and SS2 as the HDR synthetic signal.

When the two signal of the signal SS1 and the zero level signal are input from the output determining unit 51, the filter calculating unit 64 executes the filter calculation of SS1 and the zero level signal. For example, the invalidity determining unit 65 outputs "0" as the zero level signal is input from the output determining unit 51. The selector 66 selects SS1 which is not input to the filter calculating unit 64 yet according to the selection control input signal "0" from the invalidity determining unit 65. As a result, when it is the second selection pattern and the output determining unit 51 determines that SS2 is not valid, the calculation processing unit 52 outputs SS1 as the HDR synthetic signal.

When the two signals SS2 and SS3 are input from the output determining unit 51, the filter calculating unit 64 executes the filter calculation of SS2 and SS3. The invalidity determining unit 65 outputs "1" as the zero level signal is not input from the output determining unit 51. The selector 66 selects the signal from the filter calculating unit 64 according to the selection control input signal "1" from the invalidity determining unit 65. As a result, when it is the fourth selection pattern and the output determining unit 51 determines that SS3 is valid, the calculation processing unit 52 outputs a result of the process of averaging SS2 and SS3 as the HDR synthetic signal.

When the two signal of the signal SS2 and the zero level signal are input from the output determining unit 51, the filter calculating unit 64 executes the filter calculation of SS2 and the zero level signal. The invalidity determining unit 65 outputs "0" as the zero level signal is input from the output determining unit 51. The selector 66 selects SS2 which is not input to the filter calculating unit 64 yet according to the selection control input signal "0" from the invalidity determining unit 65. As a result, when it is the fourth selection pattern and the output determining unit 51 determines that SS3 is not valid, the calculation processing unit 52 outputs SS2 as the HDR synthetic signal.

When the two signals SS3 and SS4 are input from the output determining unit 51, the filter calculating unit 64 executes the filter calculation of SS3 and SS4. The invalidity determining unit 65 outputs "1" as the zero level signal is not input from the output determining unit 51. The selector 66 selects the signal from the filter calculating unit 64 according to the selection control input signal "1" from the invalidity determining unit 65. As a result, when it is the sixth selection pattern and the output determining unit 51 determines that SS4 is valid, the calculation processing unit 52 outputs a result of the process of averaging SS3 and SS4 as the HDR synthetic signal.

When the two signal of the signal SS3 and the zero level signal are input from the output determining unit 51, the filter calculating unit 64 executes the filter calculation of SS3 and the zero level signal. The invalidity determining unit 65 outputs "0" as the zero level signal is input from the output determining unit 51. The selector 66 selects SS3 which is not input to the filter calculating unit 64 yet according to the selection control input signal "0" from the invalidity determining unit 65. As a result, when it is the sixth selection pattern and the output determining unit 51 determines that SS4 is not valid, the calculation processing unit 52 outputs SS3 as the HDR synthetic signal.

The HDR synthesizing circuit 50 is not limited to the example in which the zero level signal is used as the signal representing the use of the HDR synthesis is invalidated according to the determination by the output determining unit 51. For example, the highest gradation signal may be used as the signal representing the invalidity. The highest gradation signal is the signal representing the saturation of the output charges. Both the zero level signal and the highest gradation signal are the signals which are hardly dealt as valid data in the HDR synthesis and thus can be used as the signal representing the invalidity.

According to the second embodiment, when a plurality of small pixels 22 is selected as the valid pixel in the small pixel group 21, the HDR synthesizing circuit 50 determines whether other small pixels 22 are to be included as the HDR synthesis target based on the signal from the small pixel 22 having the highest optical sensitivity among the plurality of small pixels 22. Of the signal of the small pixel 22 having the high optical sensitivity and the signals of other small pixels 22 that have been subjected to the sensitivity ratio correction, the signal of the small pixel 22 having the high optical sensitivity is higher in the original signal amount. Thus, the small pixel 22 having the high optical sensitivity has an output characteristic having the higher linearity accuracy than other small pixels 22.

The HDR synthesizing circuit 50 uses the signals of other small pixels 22 determined as to be valid based on the small pixel 22 having the high optical sensitivity for the HDR synthesis on a plurality of small pixels 22 selected as the valid pixel, and thus the high-accuracy HDR synthesis can be executed. The solid-state imaging device according to the second embodiment has an effect by which the high-quality HDR synthetic image is obtained by the high-accuracy HDR synthesis in the HDR synthesizing circuit 50.

Figure 19:
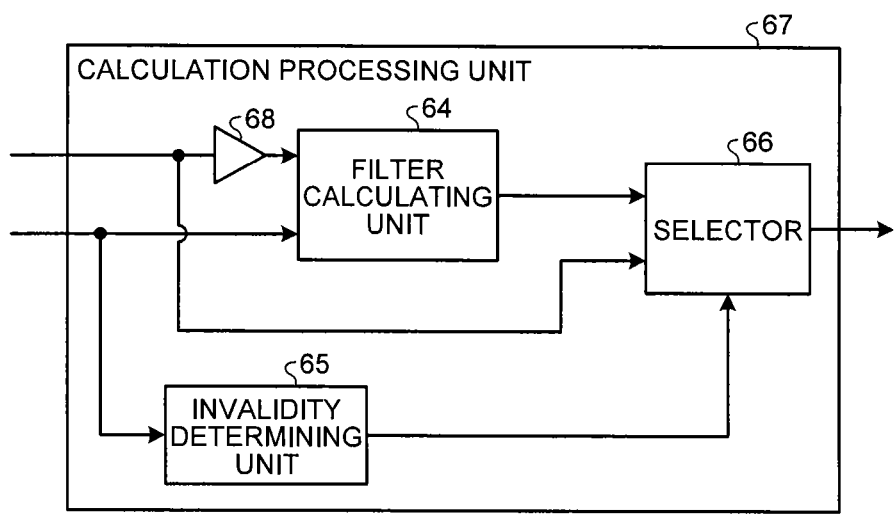
FIG. 19 is a block diagram illustrating a modified example of a calculation processing unit.

FIG. 19 is a block diagram illustrating a modified example of the calculation processing unit. A calculation processing unit 67 according to the modified example is further configured such that a multiplier 68 is provided in addition to the configuration of the calculation processing unit 52 illustrated in FIG. 18. The multiplier 68 multiplies the signal of the small pixel 22 having the higher optical sensitivity of the two signals input to the output determining unit 51 by a coefficient. The multiplier 68 and the filter calculating unit 64 functions as a weighted averaging unit that executes a weighted average filter process according to the level of the optical sensitivity on the signals of a plurality of small pixels 22 selected as the valid pixel.

For example, when weighting of 3:1 is performed on the two signals input to the output determining unit 51, the multiplier 68 multiplies the signal of the small pixel 22 having the higher optical sensitivity by 3. The filter calculating unit 64 adds the signal multiplied by the multiplier 68 to the other signal and then reduces the addition result to ¼.

The HDR synthesizing circuit 50 includes the calculation processing unit 67 according to the modified example, and can obtain the HDR synthetic signal in which the signal component from the small pixel 22 having the high optical sensitivity is weighted. Thus, the HDR synthesizing circuit 50 can increase the accuracy of the HDR synthesis. The calculation processing unit 67 according to the present modified example may be applied to the HDR synthesizing circuit according to the first and third embodiments.

Figure 20:
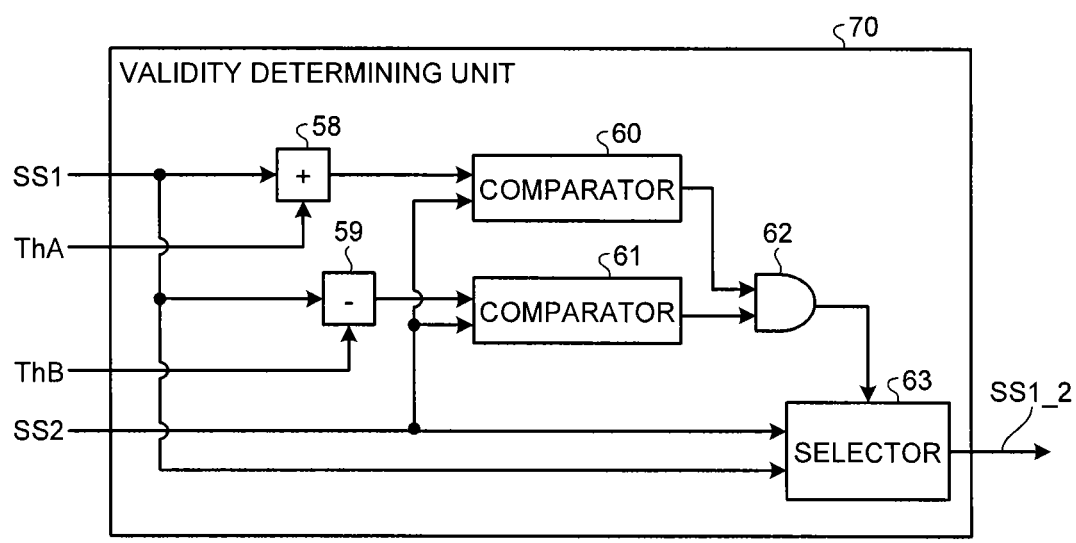
FIG. 20 is a block diagram illustrating a validity determining unit according to a modified example.

FIG. 20 is a block diagram illustrating a validity determining unit according to the modified example. In a validity determining unit 70 according to the modified example, SS2 is input to the selector 63 instead of the zero level signal (10'h0) in the validity determining unit 54 illustrated in FIG. 17. SS1 and SS2 are input to the validity determining unit 70.

The selector 63 selects either of SS1 and SS2 using the signal from the AND circuit 62 as the selection control input signal. The selector 63 selects SS2 according to the selection control input signal "1." The selector 63 selects SS1 according to the selection control input signal "0." The validity determining unit 70 outputs the selection result in the selector 63 as a signal SS1_2. When the small pixel 22B is determined to be invalid as the HDR synthesis target, the output determining unit 51 outputs SS1 instead of SS2 on the small pixel 22B.

The calculation processing unit 52 combined with the validity determining unit 70 according to the modified example outputs the result of the process of averaging the two signals as the HDR synthetic signal when the two signals are input from the output determining unit 51. When the two signals SS1 and SS2 are input from the output determining unit 51, the filter calculating unit 64 executes the filter calculation of SS1 and SS2. As a result, when it is the second selection pattern and the output determining unit 51 determines that SS2 is valid, the calculation processing unit 52 outputs the result of the process of averaging SS1 and SS2 as the HDR synthetic signal.

When the two signals SS1 and SS1 are input from the output determining unit 51, the filter calculating unit 64 executes the filter calculation of SS1 and SS1. As a result, when it is the second selection pattern and the output determining unit 51 determines that SS2 is invalid, the calculation processing unit 52 outputs SS1 as the HDR synthetic signal.

According to the present modified example, the validity determining unit receiving SS2 and SS3 and the validity determining unit receiving SS3 and SS4 have the same configuration as the validity determining unit 70. When the two signals SS2 and SS3 are input from the output determining unit 51, the filter calculating unit 64 executes the filter calculation of SS2 and SS3. As a result, when it is the fourth selection pattern and the output determining unit 51 determines that SS3 is valid, the calculation processing unit 52 outputs the result of the process of averaging SS2 and SS3 as the HDR synthetic signal.

When the two signals SS2 and SS2 are input from the output determining unit 51, the filter calculating unit 64 executes the filter calculation of SS2 and SS2. As a result, when it is the fourth selection pattern and the output determining unit 51 determines that SS3 is invalid, the calculation processing unit 52 outputs SS2 as the HDR synthetic signal.

When the two signals SS3 and SS4 are input from the output determining unit 51, the filter calculating unit 64 executes the filter calculation of SS3 and SS4. As a result, when it is the sixth selection pattern and the output determining unit 51 determines that SS4 is valid, the calculation processing unit 52 outputs the result of the process of averaging SS3 and SS4 as the HDR synthetic signal.

When the two signals SS3 and SS3 are input from the output determining unit 51, the filter calculating unit 64 executes the filter calculation of SS3 and SS3. As a result, when it is the sixth selection pattern and the output determining unit 51 determines that SS4 is invalid, the calculation processing unit 52 outputs SS3 as the HDR synthetic signal.

The HDR synthesizing circuit 50 can execute the high-accuracy HDR synthesis even when the validity determining unit 70 according to the modified example is provided. The validity determining unit 70 according to the modified example may be combined with the calculation processing unit 67 including the weighted averaging unit illustrated in FIG. 19.

Figure 21:
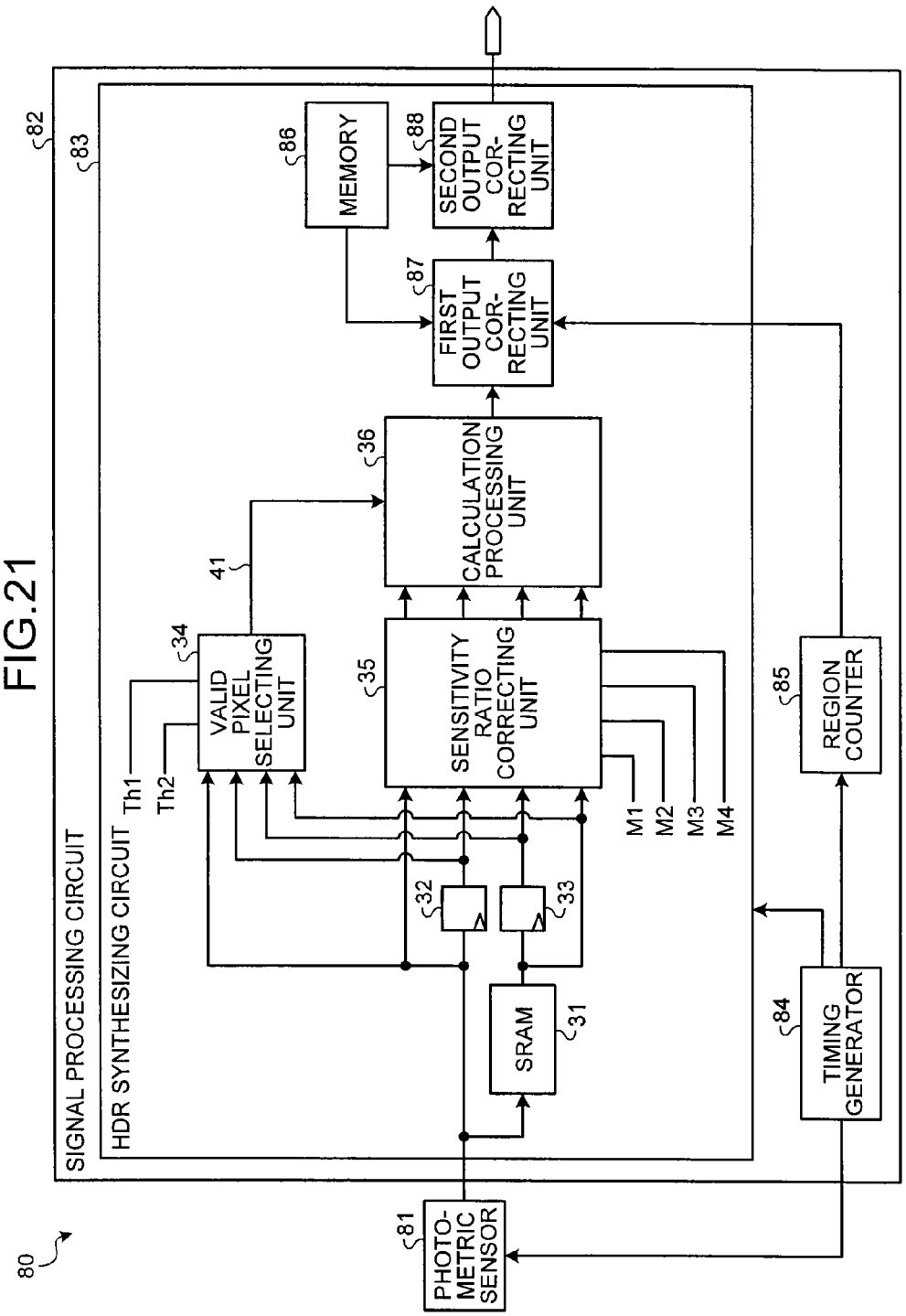
FIG. 21 is a block diagram illustrating a schematic configuration of a solid-state imaging device according to a third embodiment.

FIG. 21 is a block diagram illustrating a schematic configuration of a solid-state imaging device according to a third embodiment. The same components as in the first embodiment are denoted by the same reference numerals, and a redundant description thereof will not be repeated.

A solid-state imaging device 80 includes a signal processing circuit 82 and a photometric sensor 81 which is an imaging element. For example, the photometric sensor 81 includes a CMOS image sensor or a CCD image sensor.

Figure 22:
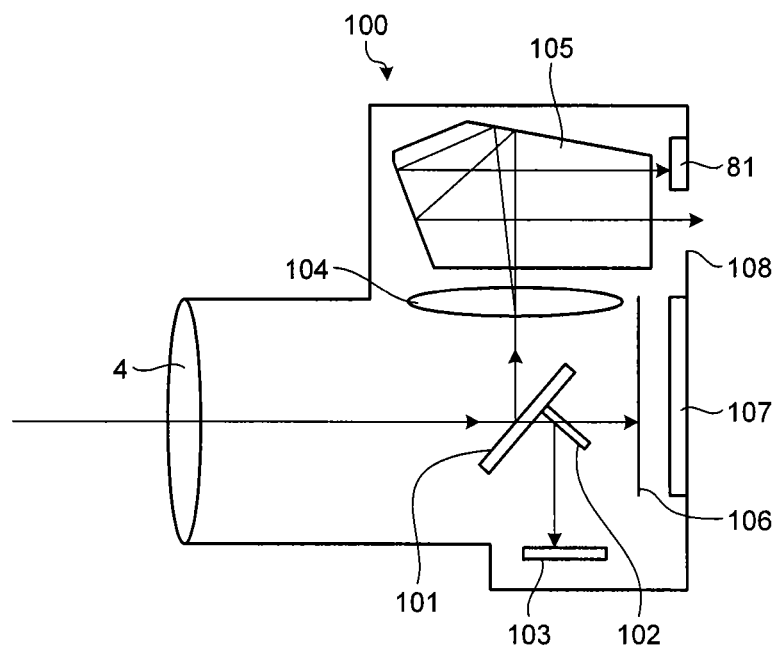
FIG. 22 is a diagram illustrating a schematic configuration of a digital camera including the solid-state imaging device according to the third embodiment.

FIG. 22 is a diagram illustrating a schematic configuration of a digital camera including the solid-state imaging device according to the third embodiment. Light incident from the subject to the imaging optical system 4 of the digital camera 100 goes to an imaging element 107 through a main mirror 101, a sub mirror 102, and a mechanical shutter 106. The digital camera 100 images a subject image through the imaging element 107.

Light reflected by the sub mirror 102 goes to an autofocus (AF) sensor 103. The digital camera 100 performs focus adjustment using the detection result of the AF sensor 103. The light reflected by the main mirror 101 goes to a photometric sensor 81 and a finder 108 through a lens 104 and a prism 105.

The photometric sensor 81 measures a quantity of light of an imaging region by the imaging optical system 4 (see FIG. 2). The photometric sensor 81 has the same configuration of the image sensor 10 according to the first embodiment. The pixel array 12 (see FIG. 1) configures the photometric sensor 81. The pixels 20 of the photometric sensor 81 configure the small pixel group 21 (see FIG. 3). The small pixel group 21 includes the four small pixels 22.

The signal processing circuit 82 includes a HDR synthesizing circuit 83, a timing generator 84, and a region counter 85. The HDR synthesizing circuit 83 further includes a memory 86, a first output correcting unit 87, and a second output correcting unit 88 in addition to the components included in the HDR synthesizing circuit 19 according to the first embodiment illustrated in FIG. 7.

The first output correcting unit 87 corrects the HDR synthetic signal for every two or more regions set to the imaging region by the imaging optical system 4. The second output correcting unit 88 corrects the HDR synthetic signal according to individual information of the digital camera 100. The memory 86 holds a parameter for correction of each region in the first output correcting unit 87 and a parameter for correction according to the individual information in the second output correcting unit 88. For example, the individual information refers to information related to an individual difference of each product such as a manufacturing error of a part such as a lens or an assembly error between parts. The signal processing circuit 82 outputs a signal corrected by the second output correcting unit 88.

The timing generator 84 generates a timing signal for controlling a timing of the entire system of a solid-state imaging device 80. The timing generator 84 outputs the timing signal to the photometric sensor 81, the HDR synthesizing circuit 83, and the region counter 85.

The region counter 85 determines a region of each signal timing from the vertical synchronous signal and the horizontal synchronous signal which are the timing signals from the timing generator 84. The region counter 85 outputs the region determination result to the first output correcting unit 87.

For example, the first output correcting unit 87 executes shading correction of each region. The shading correction is performed to correct unevenness (optical shading) of a density level occurring in the subject image due to influence of a characteristic of an imaging element, lens aberration of the imaging optical system 4, or the like.

Figure 23:
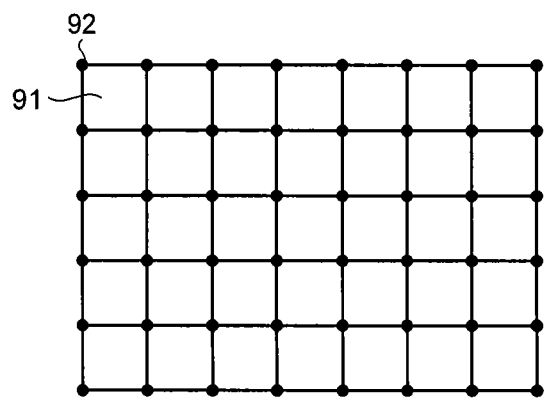
FIG. 23 is a diagram illustrating a region set to an imaging region.

FIG. 23 is a diagram illustrating a region set to the imaging region. For example, 35 regions 91 are set to the imaging region by the imaging optical system 4. The 35 regions 91 configures a matrix in which five regions are arranged in the vertical direction, and seven regions are arranged in the horizontal direction. The first output correcting unit 87 reads a shading correction parameter on the region 91 according to the region determination result from the memory 86. The first output correcting unit 87 executes the shading correction of each region 91 based on the shading correction parameter.

The first output correcting unit 87 may execute the shading correction based on the shading correction parameter set to an apex 92 of each region 91. The first output correcting unit 87 executes linear interpolation of the shading correction parameters of the four apexes 92 for each region 91. Further, the first output correcting unit 87 may specify the position in the region 91 from the vertical synchronous signal and the horizontal synchronous signal and execute the linear interpolation of each position. The first output correcting unit 87 may execute the shading correction by any method.

Figure 24:
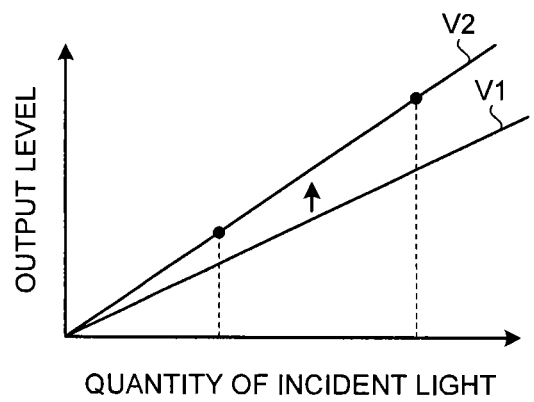
FIG. 24 is a diagram for describing correction of a signal value through a second output correcting unit.

FIG. 24 is a diagram for describing the correction of the signal value through the second output correcting unit. For example, the second output correcting unit 88 uses a design output value according to the individual information as a parameter for correction. The design output value is set on a plurality of quantities of incident light in advance. Further, the design output value is set for each digital camera 100 or for each photometric sensor 81.

The second output correcting unit 88 reads the parameter from the memory 86, and calculates a correction value V2 by linear interpolation of an actual measurement value V1 and the parameter. The second output correcting unit 88 may execute the correction according to the individual information by any method.

The second output correcting unit 88 may not only read the parameter from the memory 86 in the HDR synthesizing circuit 83 but also receive a parameter from an element in the subsequent stage processing unit 3, for example, a parameter from the ISP 6 (see FIG. 2).

Figure 25:
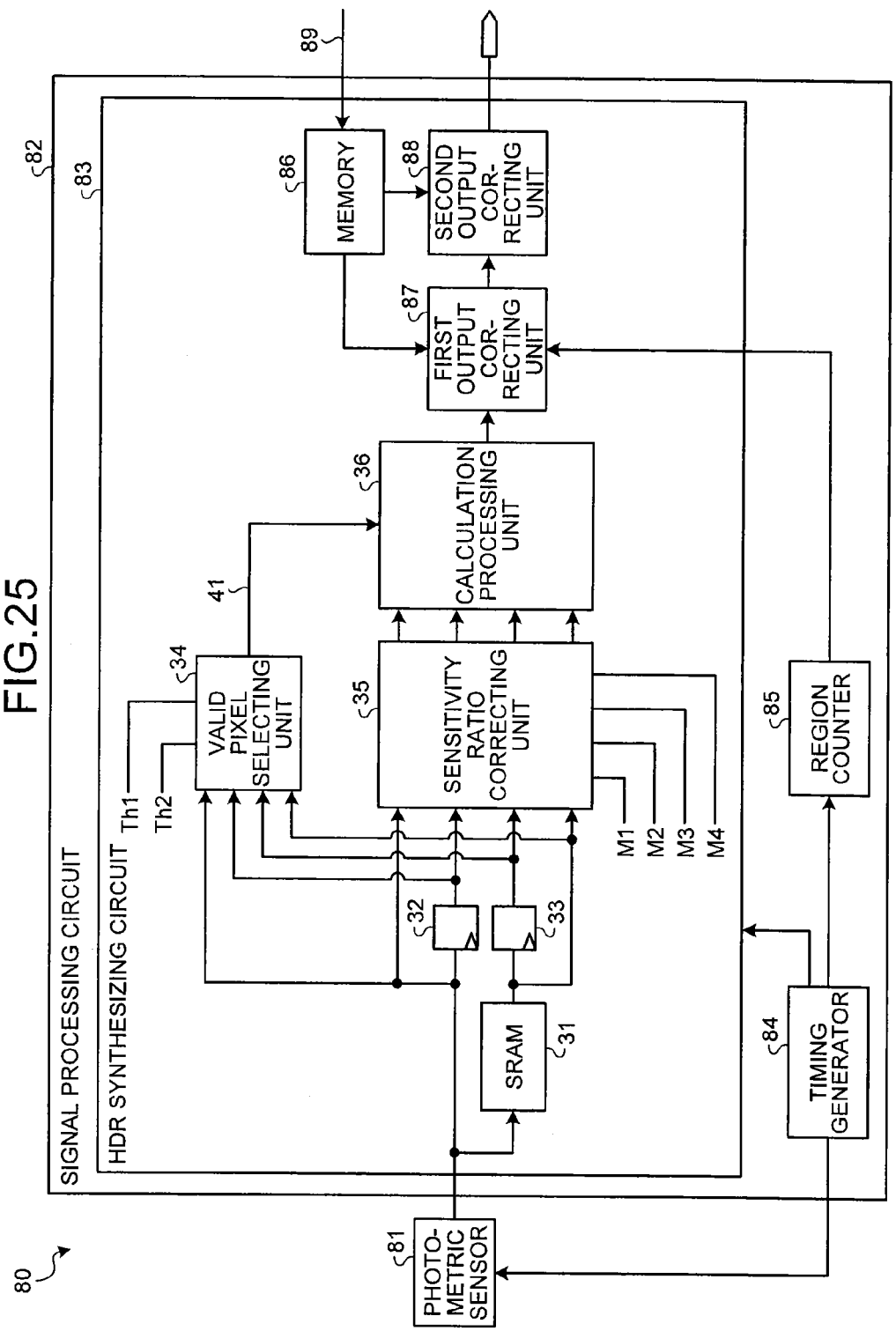
FIG. 25 is a block diagram illustrating a modified example of the solid-state imaging device according to the third embodiment.

FIG. 25 is a block diagram illustrating a modified example of the solid-state imaging device according to the third embodiment. For example, the digital camera 100 included in the solid-state imaging device 80 according to the present modified example is a camera with an interchangeable lens. When a lens is interchanged in the imaging optical system 4, for example, the ISP 6 acquires various kinds of parameters which are held by an interchange lens in advance. The memory 86 receives information 89 including the shading correction parameter and the parameter for correction according to the individual information from the ISP 6. The memory 86 changes content of the held parameter to content of the received information 89.

As a lens is interchanged, the solid-state imaging device 80 according to the present modified example changes the parameter for correction of each region 91 in the first output correcting unit 87 and the parameter for correction according to the individual information in the second output correcting unit 88. Thus, the solid-state imaging device 80 can obtain the high-quality HDR synthetic image according to a characteristic of the interchange lens.

Further, the solid-state imaging device 80 may change the parameter for correction of each region 91 in the first output correcting unit 87 according to a change in a color temperature of a light source. When the digital camera 100 detects the change in the color temperature of the light source, the memory 86 receives the shading correction parameter according to the color temperature, for example, from the ISP 6. Thus, the solid-state imaging device 80 can obtain the high-quality HDR synthetic image according to the color temperature of the light source.

According to the third embodiment, the HDR synthesizing circuit 83 executes correction of the HDR synthetic signal of each region 91 in the imaging region and correction of the HDR synthetic signal according to the individual information of the electric device including the solid-state imaging device 80. The HDR synthesizing circuit 83 can reduce deviation of the signal value caused by a variation occurring at the time of assembly of an electric device, a manufacturing error of a part, a characteristic of a lens, or the like and thus execute the high-accuracy HDR synthesis. The solid-state imaging device 80 according to the third embodiment has an effect by which the high-quality HDR synthetic image is obtained by the high-accuracy HDR synthesis in the HDR synthesizing circuit 83.

The HDR synthesizing circuit 83 is not limited to the example of the circuit including both the first output correcting unit 87 and the second output correcting unit 88. The HDR synthesizing circuit 83 may include either of the first output correcting unit 87 and the second output correcting unit 88. The solid-state imaging device 80 according to the third embodiment may include the output determining unit 51 (see FIG. 11) according to the second embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A solid-state imaging device, comprising:
a pixel array that includes a plurality of pixels arranged in a horizontal direction and a vertical direction and generates signal charges according to a quantity of light incident to each pixel; and
a high dynamic range synthesizing circuit that executes a high dynamic range synthesis using an image signal from the pixel array,
wherein the pixel is configured as a small pixel group including a plurality of small pixels each of which is capable of reading the signal charge,
the small pixel group includes two or more small pixels that differ from each other in optical sensitivity, and
the high dynamic range synthesizing circuit includes
a valid pixel selecting unit that selects one or more small pixels validating a use of a signal value in the high dynamic range synthesis as a valid pixel from among the small pixel group,
a sensitivity ratio correcting unit that executes sensitivity ratio correction according to a ratio of the optical sensitivity between the small pixels on the signal value of each small pixel, and
a calculation processing unit that executes a calculation for the high dynamic range synthesis using the signal value of the valid pixel among the signal values of the small pixels from the sensitivity ratio correcting unit.

2. The solid-state imaging device according to claim 1, wherein the small pixel group includes two or more small pixels that become different from each other in optical sensitivity by changing at least one of an area size of an opening of the small pixel, an electronic shutter time, and an analog gain.

3. The solid-state imaging device according to claim 1, wherein the valid pixel selecting unit selects the valid pixel according to a result of comparing the signal value of the small pixel with a previously set threshold value.

4. The solid-state imaging device according to claim 3, wherein the valid pixel selecting unit selects the small pixel having a signal value included in a range between a first threshold value and a second threshold value set to an output level higher than the first threshold value as the valid pixel.

5. The solid-state imaging device according to claim 3, wherein output characteristics of the small pixels are set such that a range in which all the small pixels, which overlap each other in a range of a quantity of incident light in which a signal according to a quantity of incident light is able to be output, satisfy a condition of the valid pixel is present.

6. The solid-state imaging device according to claim 1, wherein the high dynamic range synthesizing circuit further includes an output determining unit that executes an output determination on a signal value that has been subjected to the sensitivity ratio correction by the sensitivity ratio correcting unit,
when the valid pixel selecting unit selects two or more valid pixels from the small pixel group, the output determining unit determines whether another valid pixel is valid as a target of the high dynamic range synthesis using a valid pixel having the highest signal value among the two or more valid pixels as a reference, and
the calculation processing unit outputs a calculation result based on a signal value of a valid pixel determined to be valid by the output determining unit.

7. The solid-state imaging device according to claim 6, wherein the output determining unit determines the other valid pixel is invalid as the target of the high dynamic range synthesis when the signal value of the other valid pixel that has been subjected to the sensitivity ratio correction is not included within a range of an output level set to include the signal value of the valid pixel used as the reference.

8. The solid-state imaging device according to claim 6, wherein when the other valid pixel is determined to be invalid as the target of the high dynamic range synthesis, the output determining unit outputs either of a zero level signal and a highest gradation signal to the other valid pixel.

9. The solid-state imaging device according to claim 6, wherein when the other valid pixel is determined to be invalid as the target of the high dynamic range synthesis, the output determining unit outputs the signal value of the valid pixel used as the reference to the other valid pixel.

10. The solid-state imaging device according to claim 1, wherein the calculation processing unit further includes a weighted averaging unit that executes a weighted average filter process according to a level of the optical sensitivity on signals of a plurality of small pixels selected as the valid pixel.

11. The solid-state imaging device according to claim 1, wherein the high dynamic range synthesizing circuit further includes an output correcting unit that executes correction of each region set to an imaging region by an imaging optical system on the signal value that has been subjected to the high dynamic range synthesis.

12. The solid-state imaging device according to claim 11, wherein the pixel array configures a photometric sensor that measures a quantity of light of the imaging region.

13. The solid-state imaging device according to claim 11, wherein the output correcting unit executes shading correction of each region.

14. The solid-state imaging device according to claim 11, further comprising
a memory that holds a parameter for correction of each region,
wherein an electric device including the solid-state imaging device is a camera with an interchangeable lens, and
the memory changes content of a parameter to be held according to a lens interchange in the imaging optical system.

15. The solid-state imaging device according to claim 11, further comprising
a memory that holds a parameter for correction of each region,
wherein the memory changes content of a parameter to be held according to a change in a color temperature of a light source.

16. The solid-state imaging device according to claim 1, wherein the high dynamic range synthesizing circuit further includes an output correcting unit that executes correction according to individual information of an electric device including the solid-state imaging device on the signal value that has been subjected to the high dynamic range synthesis.

17. The solid-state imaging device according to claim 16, wherein the pixel array configures a photometric sensor that measures a quantity of light of an imaging region by an imaging optical system.

18. The solid-state imaging device according to claim 16, wherein the output correcting unit uses a design output value according to the individual information as a parameter for the correction.

19. The solid-state imaging device according to claim 16, further comprising
a memory that holds a parameter for correction according to the individual information,
wherein an electric device including the solid-state imaging device is a camera with an interchangeable lens, and
the memory changes content of a parameter to be held according to a lens interchange in the imaging optical system.

20. A camera module comprising:
an imaging optical system which captures light from an object and forms an object image; and
a solid-state imaging device which converts the light captured by the imaging optical system into signal charges and captures the object image,
wherein the solid-state imaging device includes:
a pixel array that includes a plurality of pixels arranged in a horizontal direction and a vertical direction and generates the signal charges according to a quantity of light incident to each pixel; and
a high dynamic range synthesizing circuit that executes a high dynamic range synthesis using an image signal from the pixel array,
wherein the pixel is configured as a small pixel group including a plurality of small pixels each of which is capable of reading the signal charge,
the small pixel group includes two or more small pixels that differ from each other in optical sensitivity, and
the high dynamic range synthesizing circuit includes
a valid pixel selecting unit that selects one or more small pixels validating a use of a signal value in the high dynamic range synthesis as a valid pixel from among the small pixel group,
a sensitivity ratio correcting unit that executes sensitivity ratio correction according to a ratio of the optical sensitivity between the small pixels on the signal value of each small pixel, and
a calculation processing unit that executes a calculation for the high dynamic range synthesis using the signal value of the valid pixel among the signal values of the small pixels from the sensitivity ratio correcting unit.

* * * * *